United States Patent
Ando et al.

(10) Patent No.: US 10,763,043 B2
(45) Date of Patent: Sep. 1, 2020

(54) ELECTRONIC DEVICE

(71) Applicant: TDK CORPORATION, Tokyo (JP)

(72) Inventors: Norihisa Ando, Tokyo (JP); Sunao Masuda, Tokyo (JP); Masahiro Mori, Tokyo (JP); Kayou Matsunaga, Tokyo (JP); Kosuke Yazawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 76 days.

(21) Appl. No.: 16/197,870

(22) Filed: Nov. 21, 2018

(65) Prior Publication Data

US 2019/0206626 A1  Jul. 4, 2019

(30) Foreign Application Priority Data

Dec. 28, 2017 (JP) .................. 2017-254093

(51) Int. Cl.
| | |
|---|---|
| *H01G 4/30* | (2006.01) |
| *H01G 4/232* | (2006.01) |
| *H01G 4/248* | (2006.01) |
| *H01G 4/38* | (2006.01) |
| *H01G 4/008* | (2006.01) |
| *H01G 4/12* | (2006.01) |

(52) U.S. Cl.
CPC .......... *H01G 4/248* (2013.01); *H01G 4/2325* (2013.01); *H01G 4/30* (2013.01); *H01G 4/38* (2013.01); *H01G 4/008* (2013.01); *H01G 4/1227* (2013.01)

(58) Field of Classification Search
CPC ........ H01G 4/30; H01G 4/232; H01G 4/2325; H01G 4/248; H01G 4/38

USPC ......... 361/321.1, 321.2, 301.4, 306.3, 321.3, 361/328, 306.1, 308.1, 309
See application file for complete search history.

(56) References Cited

U.S. PATENT DOCUMENTS

| | | | |
|---|---|---|---|
| 6,288,887 B1 | 9/2001 | Yoshida et al. | |
| 7,331,799 B1 * | 2/2008 | Lee .................... | H01G 2/06 361/306.3 |
| 2004/0183147 A1 * | 9/2004 | Togashi ............. | H01G 2/065 257/414 |
| 2005/0041367 A1 * | 2/2005 | Yoshii ................ | H01G 2/065 361/303 |
| 2016/0260546 A1 * | 9/2016 | Mori .................. | H01G 4/232 |

FOREIGN PATENT DOCUMENTS

JP  2000-235932 A  8/2000

* cited by examiner

*Primary Examiner* — Arun Ramaswamy
(74) *Attorney, Agent, or Firm* — Oliff PLC

(57) ABSTRACT

An electronic device includes a chip component and a metal terminal. The chip component includes an element body containing laminated internal electrodes and a terminal electrode formed outside the element body to connect with ends of the internal electrodes. The metal terminal is connectable with the terminal electrode of the chip component. The metal terminal includes an electrode facing portion, a holding portion, and a mount portion. A connection member connecting between the electrode facing portion and the end surface of the terminal electrode exists in a joint region in a predetermined range. A non-joint region is formed between an edge of the joint region and the holding portion. A non-joint gap between the electrode facing portion and the end surface of the terminal electrode becomes larger toward the holding portion in the non-joint region.

19 Claims, 20 Drawing Sheets

ELECTRONIC DEVICE

BACKGROUND OF THE INVENTION

The present invention relates to an electronic device attached with a terminal.

In addition to a normal chip component that is solely directly mounted on a board, as shown in Patent Document 1 for example, a chip component attached with a metal terminal is proposed as an electronic device, such as a ceramic capacitor.

It is reported that the electronic device attached with a metal terminal after being mounted has a reduction effect on a deformation stress that travels from a board to a chip component and a protection effect on a chip component from impacts or so. Thus, the electronic device attached with a metal terminal is used in a field where durability, reliability, and the like are required.

In conventional electronic devices with a metal terminal, however, a terminal electrode of a chip component and a metal terminal are joined by only a solder, and there is a problem with the joint. For example, the soldering operation needs to be conducted while the terminal electrode of the chip component and the metal terminal are being positioned. In particular, when a plurality of chip components is soldered to a pair of metal terminals, this operation is complicated, and the joint reliability may decrease.

When the entire end surface of the terminal electrode of the chip component is soldered with the metal terminal, the connection strength between the metal terminal and the terminal electrode is improved, but the metal terminal is hard to be deformed elastically. In this case, vibrations easily travel from the chip component to a board or so, and a so-called acoustic noise phenomenon may be generated. For use in a high temperature environment or an environment of large temperature variation, the connection between the chip component and the metal terminal may be released due to difference in thermal expansion coefficient between the chip component and the metal terminal.

Incidentally, an electronic device connecting a chip component and a metal terminal by an engagement arm is also proposed. In this structure, a prevention effect on acoustic noise phenomenon is expected to be demonstrated. To further increase a connection strength between the chip component and the metal terminal, it is considered in this structure that a metal terminal and an end surface of a terminal electrode of a chip component are connected by solder. In this case, however, the prevention effect on acoustic noise phenomenon may be weakened.
Patent Document 1: JP2000235932 (A)

BRIEF SUMMARY OF INVENTION

The present invention has been achieved under such circumstances. It is an object of the invention to provide an electronic device capable of securely and firmly connecting a chip component and a metal terminal and excellent in a prevention effect on acoustic noise phenomenon.

To achieve the above object, an electronic device according to a first aspect of the present invention includes:
a chip component including an element body containing laminated internal electrodes and a terminal electrode formed outside the element body so as to connect with ends of the internal electrodes; and
a metal terminal connectable with the terminal electrode of the chip component,
wherein the metal terminal includes:
an electrode facing portion disposed correspondingly to an end surface of the terminal electrode;
a holding portion configured to hold the chip component; and
a mount portion configured to be placed on a mount surface,
wherein a connection member connecting between the electrode facing portion and the end surface of the terminal electrode exists in a joint region in a predetermined range,
wherein a non-joint region is formed between an edge of the joint region and the holding portion, and
wherein a non-joint gap between the electrode facing portion and the end surface of the terminal electrode becomes larger toward the holding portion in the non-joint region.

In the electronic device according to the first aspect of the present invention, the chip component is held by the holding portion of the metal terminal, and the metal terminal and the chip component are further connected by the connection member, such as solder, in the joint region in a predetermined range, whereby the chip component and the metal terminal can be connected securely and firmly. Incidentally, the connection member is not limited to solder, and can be a conductive adhesive or so.

The non-joint gap between the electrode facing portion and the end surface of the terminal electrode becomes larger toward the holding portion in the non-joint region. In the non-joint region, the electrode facing portion of the metal terminal can thereby freely elastically be deformed without being disturbed by the terminal electrode, and stress is reduced. This favorably maintains an elastic property of the holding portion continuing to the non-joint region, and the chip component can favorably be held by the holding portion. In addition, the metal terminal is easily elastically deformed, and an acoustic noise phenomenon can be prevented effectively.

Preferably, a maximum width of the non-joint gap is 1.2 to 7 times larger than a minimum width of the non-joint gap. Preferably, a minimum width of the non-joint gap is as large as a thickness of the connection member. In this range, the holding portion continuing to the non-joint region can have a favorable elasticity and favorably hold the chip component, the metal terminal can easily elastically be deformed, and an acoustic noise phenomenon can effectively be prevented.

An electronic device according to a second aspect of the present invention includes:
a chip component including an element body containing laminated internal electrodes and a terminal electrode formed outside the element body so as to connect with ends of the internal electrodes; and
a metal terminal connectable with the terminal electrode of the chip component,
wherein the metal terminal includes:
an electrode facing portion disposed correspondingly to the end surface of the terminal electrode;
a holding portion configured to hold the chip component; and
a mount portion configured to be placed on a mount surface,
wherein a connection member connecting between the electrode facing portion and the end surface of the terminal electrode exists in a joint region in a predetermined range,
wherein a non-joint region is formed between an edge of the joint region and the holding portion, and wherein the electrode facing portion is warped from the end surface of the terminal electrode toward the holding portion in the non-joint region.

Similarly to the electronic device according to the first aspect, the electronic device according to the second aspect of the present invention can securely and firmly connect the chip component and the metal terminal. Moreover, the electrode facing portion is warped from the end surface of the terminal electrode toward the holding portion in the non-joint region. In the non-joint region, the electrode facing portion of the metal terminal can thereby freely elastically be deformed without being disturbed by the terminal electrode, and stress is reduced. This favorably maintains an elastic property of the holding portion continuing to the non-joint region, and the chip component can favorably be held by the holding portion. In addition, the metal terminal is easily elastically deformed, and an acoustic noise phenomenon can be prevented effectively.

Preferably, an area of the non-joint region is larger than 3/10 of an area of the joint region between the electrode facing portion and the end surface of the terminal electrode. This structure improves the effects of the present embodiment.

Preferably, end surfaces of terminal electrodes of a plurality of chip components are joined with the electrode facing portion while being arranged adjacent to each other in a plurality of joint regions, and the non-joint region is also formed between the adjacent joint regions. In this structure, a plurality of chip components is easily connected by a pair of metal terminals, and an acoustic noise phenomenon can be prevented due to existence of the non-joint region existing between the chip components.

Preferably, a first through hole going through front and back surfaces of the electrode facing portion is formed in the joint region. An application state of the connection member in the joint region can be observed from outside via the first through hole. Moreover, bubbles contained in the connection member, such as solder, can be released via the first through hole. This stabilizes the joint even if the amount of the connection member, such as solder, is small.

Preferably, a second through hole going through front and back surfaces of the electrode facing portion is formed in the non-joint region, and the holding portion extends from an opening edge of the second through hole. In this structure, the second through hole and the holding portion can easily be formed and arranged closely, and it is possible to more effectively prevent a vibration transmission from the chip component to the metal terminal.

Protrusions protruding toward the end surface of the terminal electrode may be formed on an inner surface of the electrode facing portion in the joint region. This structure can easily control an application area of the connection member and also easily control a thickness of the joint region. In addition, this structure stabilizes the connection of the connection member even if the amount of the connection member is small.

Preferably, the holding portion is formed in the second through hole near the mount portion. In this structure, electrostrictive strain vibrations of the internal electrodes can be prevented from traveling to the metal terminal near the mount portion. The holding portion is hard to be influenced by the electrostrictive strain vibrations and can securely hold the chip component.

DETAILED DESCRIPTION OF INVENTION

Hereinafter, the present invention is described based on embodiments shown in the figures.

First Embodiment

Figure 1A:
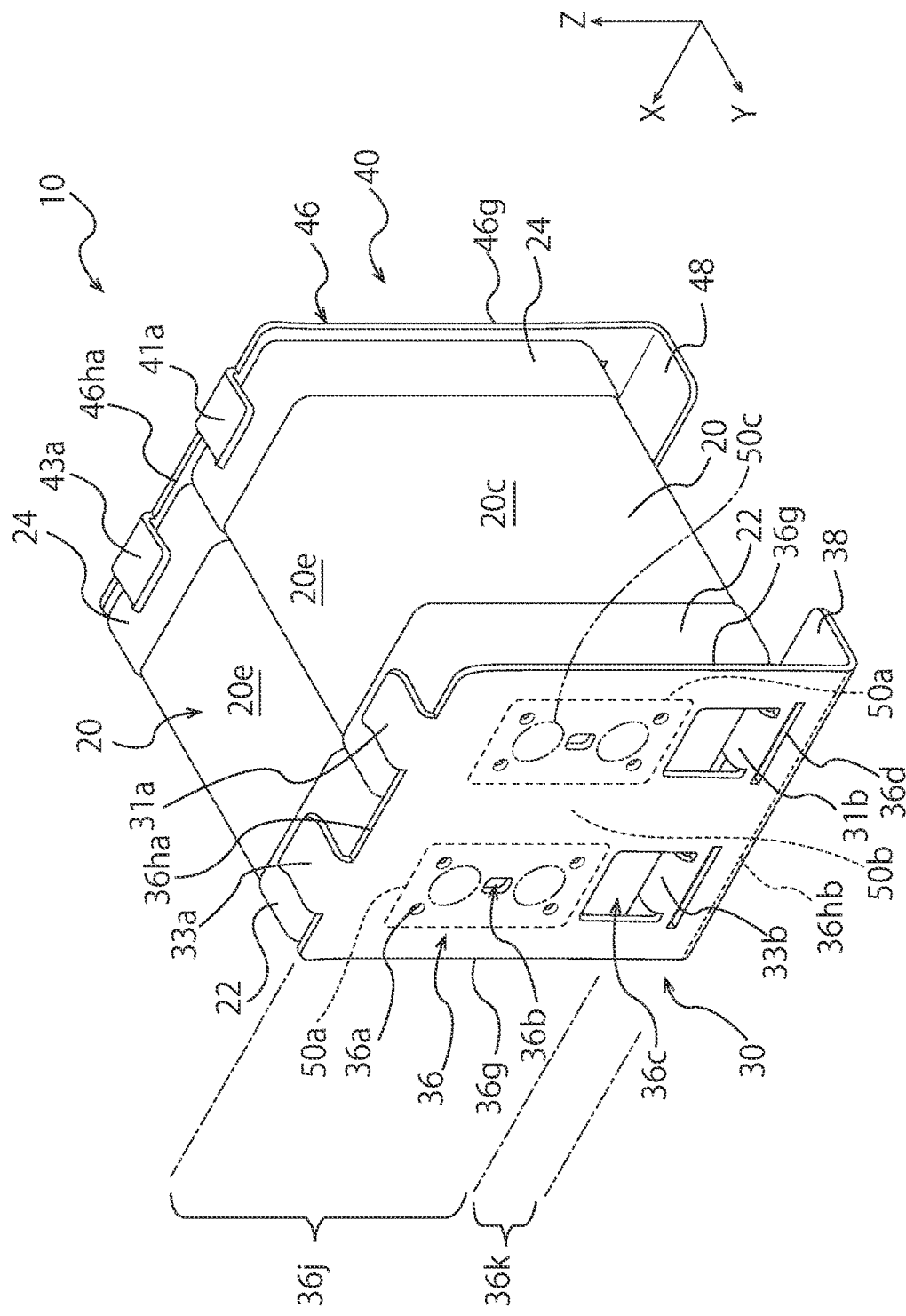
FIG. 1A is a schematic perspective view illustrating a ceramic electronic device according to an embodiment of the present invention.

FIG. 1A is a schematic perspective view illustrating a capacitor 10 as an electronic device according to First Embodiment of the present invention. The capacitor 10 has capacitor chips 20 as chip components and a pair of metal terminals 30 and 40. The capacitor 10 according to First Embodiment has two capacitor chips 20, but the capacitor 10 may have one capacitor chip 20 or any plural capacitor chips 20.

Incidentally, each embodiment is described with a capacitor where the capacitor chips 20 are equipped with the metal terminals 30 and 40, but the ceramic electronic device of the present invention is not limited to this capacitor, and may be a chip component other than capacitors equipped with the metal terminals 30 and 40.

In the figures, the X-axis, the Y-axis, and the Z-axis are perpendicular to each other, the X-axis is parallel to a direction where the capacitor chips 20 are arranged as shown in FIG. 1A, the Z-axis corresponds with a height direction of the capacitor 10 from a mount surface, and the Y-axis corresponds with a direction where a pair of terminal electrodes 22 and 24 of the chip 20 is mutually arranged on the opposite side.

Figure 2A:
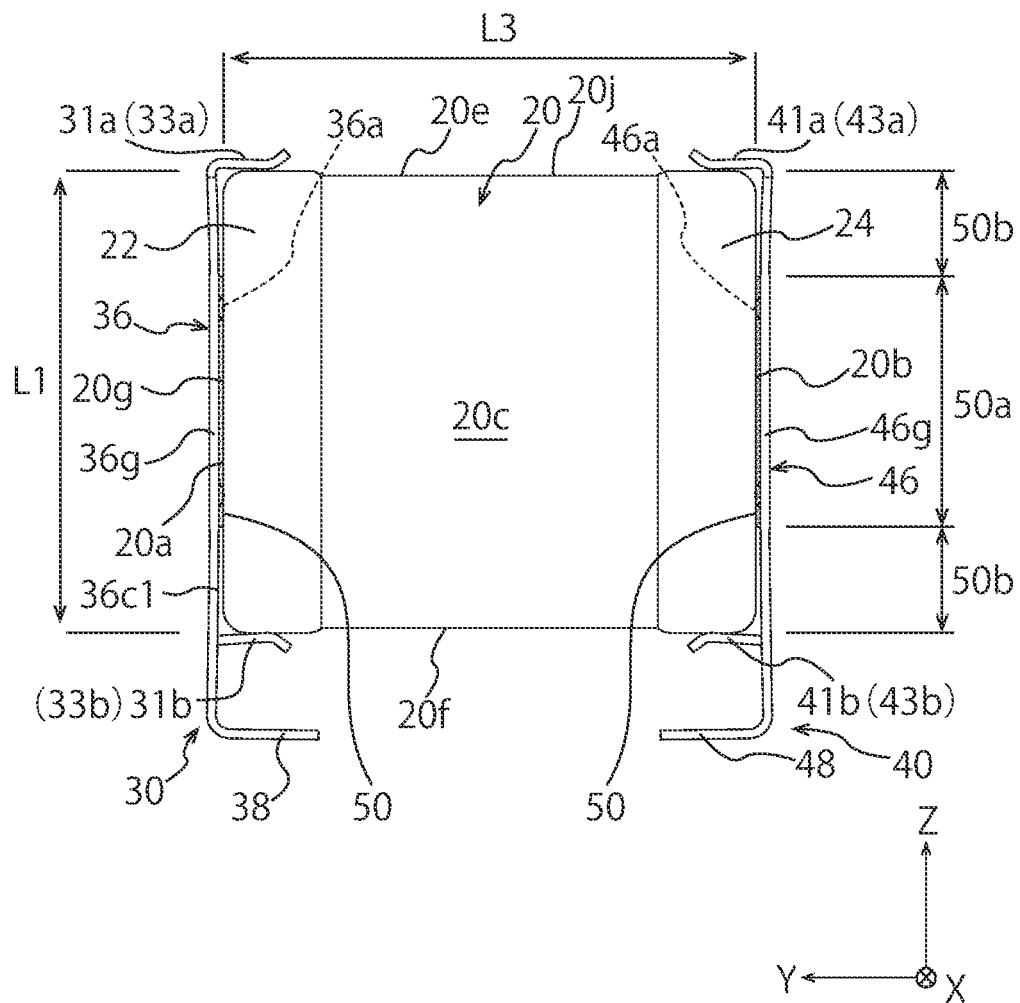
FIG. 2A is a front view of the ceramic electronic device shown in FIG. 1A.
Figure 2B:
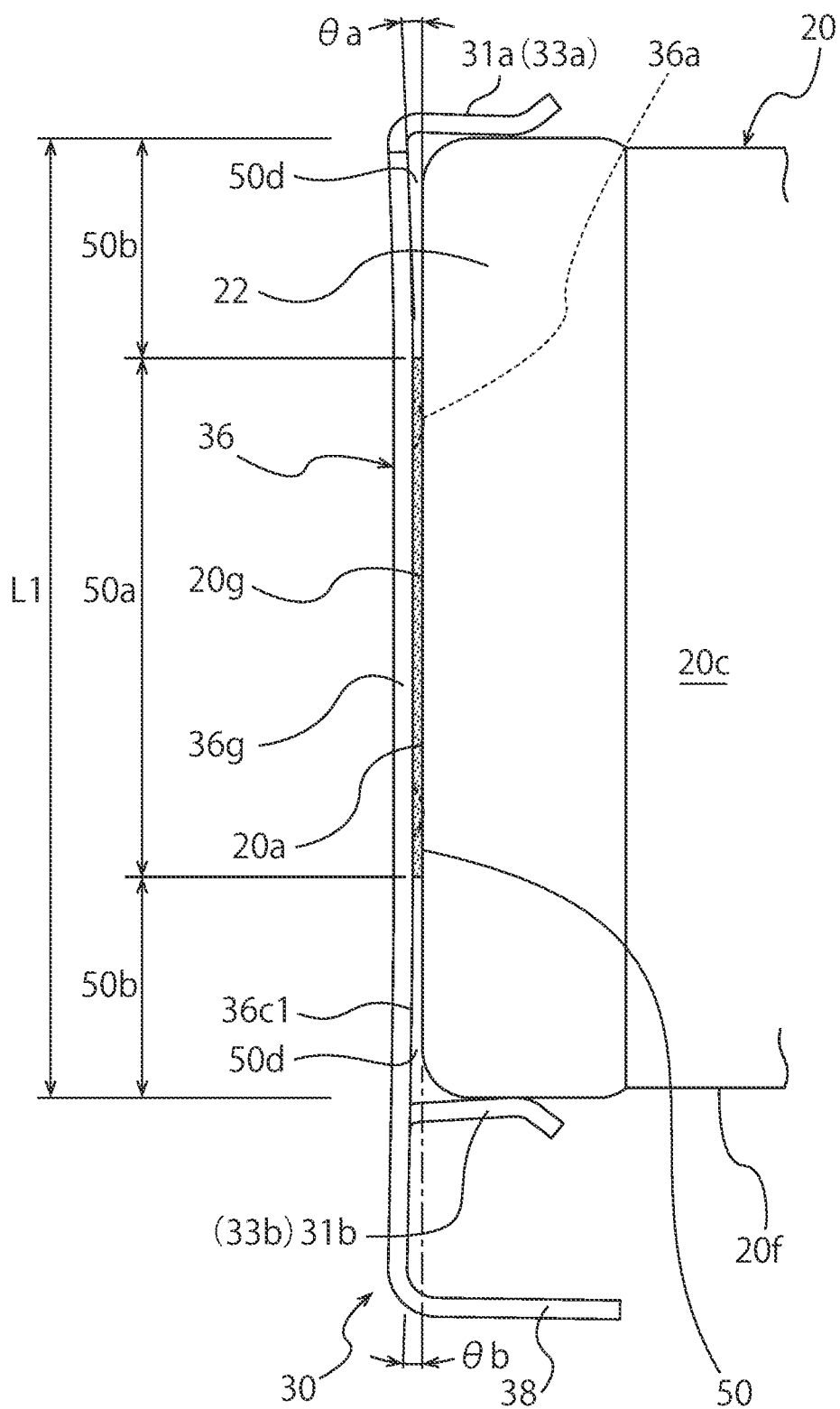
FIG. 2B is an enlarged view of a main part of the ceramic electronic device shown in FIG. 2A.

The capacitor chips 20 have an approximately rectangular parallelepiped shape, and each of the two capacitor chips 20 has approximately the same shape and size. As shown in FIG. 2A and FIG. 2B, the capacitor chips 20 have a pair of chip end surfaces facing each other, and the pair of chip end surfaces consists of a first end surface 20a and a second end surface 20b. As shown in FIG. 1A, FIG. 2A, and FIG. 4, the first and second end surfaces 20a and 20b have an approximately rectangular shape. In four sides constituting each rectangle of the first and second end surfaces 20a and 20b, a pair of longer sides is chip first sides 20g (see FIG. 2A), and a pair of shorter sides is chip second sides 20h (see FIG. 3A).

The capacitor chips 20 are arranged so that the first end surfaces 20a and the second end surfaces 20b are perpendicular to a mount surface, in other words, the chip third sides 20j of the capacitor chips 20 connecting between the first end surfaces 20a and the second end surfaces 20b are parallel to the mount surface of the capacitor 10. Incidentally, the mount surface of the capacitor 10 is a surface attached with the capacitor 10 by solder or so and facing mount portions 38 and 48 of the metal terminals 30 and 40 mentioned below, and is a parallel surface to the X-Y plane shown in FIG. 1A.

When comparing a length L1 of the chip first sides 20g shown in FIG. 2A with a length L2 of the chip second sides 20h shown in FIG. 4, the chip second sides 20h are shorter than the chip first sides 20g (L1>L2). The chip first sides 20g and the chip second sides 20h have any length ratio, but L2/L1 is about 0.3 to 0.7, for example.

The capacitor chips 20 are arranged so that the chip first sides 20g are perpendicular to the mount surface as shown in FIG. 2A, and that the chip second sides 20h are parallel to the mount surface as shown in FIG. 4. In the first to fourth side surfaces 20c to 20f, which are the four chip side surfaces connecting the first end surfaces 20a and the second end surfaces 20b, the first and second side surfaces 20c and 20d have large areas and are arranged perpendicularly to the mount surface, and the third and fourth side surfaces 20e and 20f have areas that are smaller than those of the first and second side surfaces 20c and 20d and are arranged in parallel to the mount surface. The third side surface 20e is an upper side surface facing the opposite direction to the mount portions 38 and 48 below, and the fourth sides surface 20f is a lower side surface facing the mount portions 38 and 48.

As shown in FIG. 1A, FIG. 2A, and FIG. 4, the first terminal electrode 22 of each capacitor chip 20 is formed to reach from the first end surface 20a to a part of the first to fourth side surfaces 20c to 20f Thus, each of the first terminal electrodes 22 has a part arranged on the first end surface 20a and a part arranged on the first to fourth side surfaces 20c and 20f.

The second terminal electrode 24 of each capacitor chip 20 is formed to reach from the second end surface 20b to another part of the first to fourth side surfaces 20c to 20f (a different part from the part where the first terminal electrode 22 reach). Thus, each of the second terminal electrodes 24 has a part arranged on the second end surface 20b and a part arranged on the first to fourth side surfaces 20c to 20f (see FIG. 1A, FIG. 2A, and FIG. 4). The first terminal electrode 22 and the second terminal electrode 24 are arranged with a predetermined distance on the first to fourth side surfaces 20c to 20f.

Figure 6:
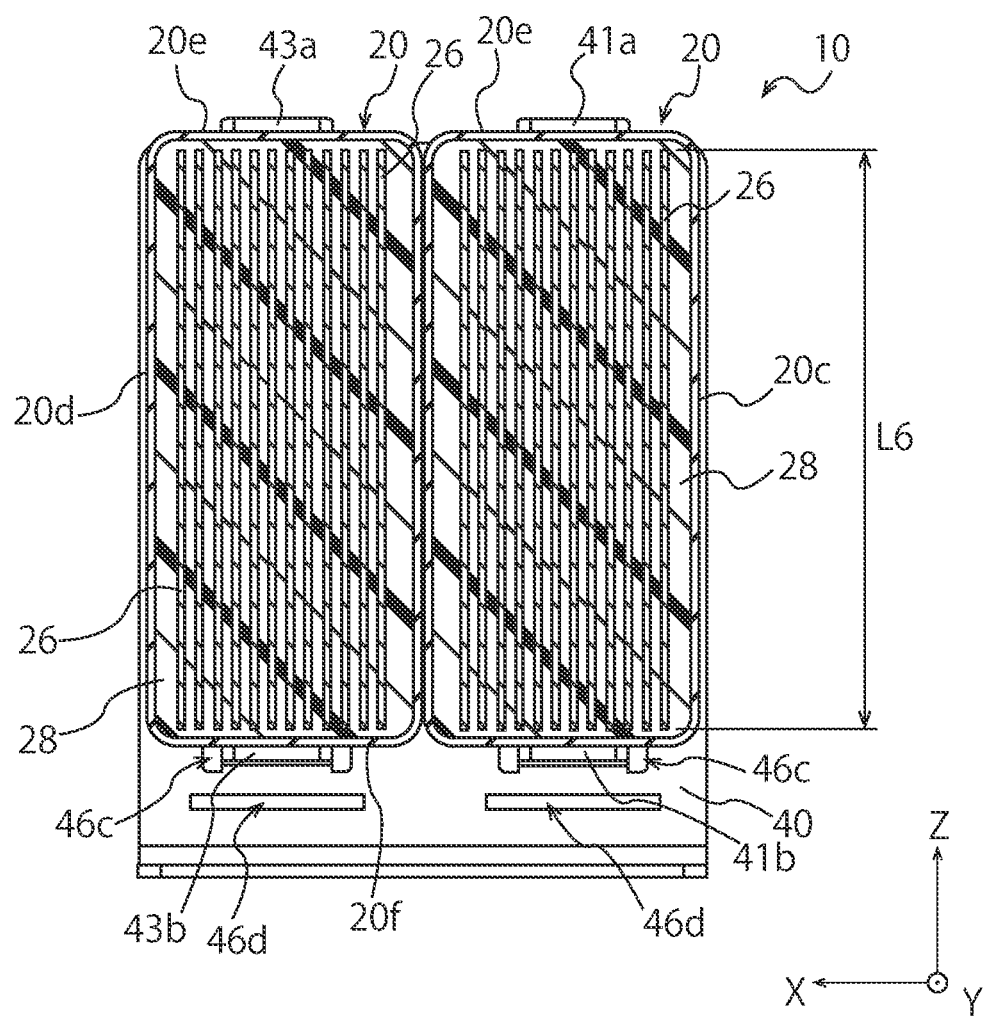
FIG. 6 is a cross-sectional view perpendicular to the Y-axis of the ceramic electronic device shown in FIG. 1A and FIG. 1B.

As shown in FIG. 6, which schematically illustrates an internal structure of the capacitor chips 20, the capacitor chips 20 are a multilayer capacitor where internal electrode layers 26 and dielectric layers 28 are laminated. In the internal electrode layers 26, internal electrode layers 26 connected with the first terminal electrode 22 and internal electrode layers 26 connected with the second terminal electrode 24 are laminated alternately by sandwiching the dielectric layers 28.

As shown in FIG. 6, the internal electrode layers 26 of each capacitor chip 20 have a lamination direction that is parallel to the X-axis and perpendicular to the Y-axis. That is, the internal electrode layers 26 shown in FIG. 6 are arranged in parallel to the plane of the Z-axis and the Y-axis and perpendicularly to the mount surface.

The dielectric layers 28 of each capacitor chip 20 are composed of any dielectric material, such as calcium titanate, strontium titanate, barium titanate, and a mixture thereof. Each of the dielectric layers 28 has any thickness, but normally has a thickness of several μm to several hundred μm. In the present embodiment, each of the dielectric layers 28 preferably has a thickness of 1.0 to 5.0 μm. The dielectric layers 28 preferably have a main component of barium titanate, which can increase capacitance of capacitors.

The internal electrode layers 26 contain any conductive material, but may contain a comparatively inexpensive base metal when the dielectric layers 28 are composed of a reduction resistant material. The base metal is preferably Ni or a Ni alloy. The Ni alloy is preferably an alloy of Ni and one or more elements of Mn, Cr, Co, and Al, and preferably contains Ni at 95 wt % or more. Incidentally, Ni or the Ni alloy may contain various fine components, such as P, at about 0.1 wt % or less. The internal electrode layers 26 may be formed using a commercially available electrode paste. Each of the internal electrode layers 26 has a thickness appropriately determined based on usage or so.

The first and second terminal electrodes 22 and 24 are also composed of any material. The first and second terminal electrodes 22 and 24 are normally composed of copper, copper alloy, nickel, nickel alloy, or the like, but may be composed of silver, an alloy of silver and palladium, or the like. Each of the first and second terminal electrodes 22 and 24 also has any thickness, but normally has a thickness of about 10 to 50 μm. Incidentally, at least one metal film of Ni, Cu, Sn, etc. may be formed on the surfaces of the first and second terminal electrodes 22 and 24.

The capacitor chips 20 have shape and size that are appropriately determined based on object and usage. For example, each of the capacitor chips 20 has a length (L3 shown in FIG. 2A) of 1.0 to 6.5 mm, preferably 3.2 to 5.9 mm, a width (L1 shown in FIG. 2A) of 0.5 to 5.5 mm, preferably 1.6 to 5.2 mm, and a thickness (L2 shown in FIG. 4) of 0.3 to 3.5 mm, preferably 0.8 to 3.2 mm. When the capacitor 10 has a plurality of capacitor chips 20, the capacitor chips 20 may have mutually different size and shape.

The pair of metal terminals 30 and 40 of the capacitor 10 is arranged correspondingly with the first and second end surfaces 20a and 20b, which are a pair of chip end surfaces.

That is, the first metal terminal 30, which is one of the pair of metal terminals 30 and 40, is arranged correspondingly with the first terminal electrodes 22, which are one of the pair of terminal electrodes 22 and 24, and the second metal terminal 40, which is the other of the pair of metal terminals 30 and 40, is arranged correspondingly with the second terminal electrodes 24, which are the other of the pair of terminal electrodes 22 and 24.

The first metal terminal 30 has an electrode facing portion 36, a plurality of pairs of engagement arm portions (holding portions) 31a, 31b, 33a, and 33b, and a mount portion 38. The electrode facing portion 36 faces the first terminal electrodes 22. The engagement arm portions 31a, 31b, 33a, and 33b sandwich and hold the capacitor chips 20 from both ends of the chip first sides 20g in the Z-axis direction. The mount portion 38 extends from the electrode facing portion 36 toward the capacitor chips 20 and is at least partially approximately perpendicular to the electrode facing portion 36.

Figure 3A:
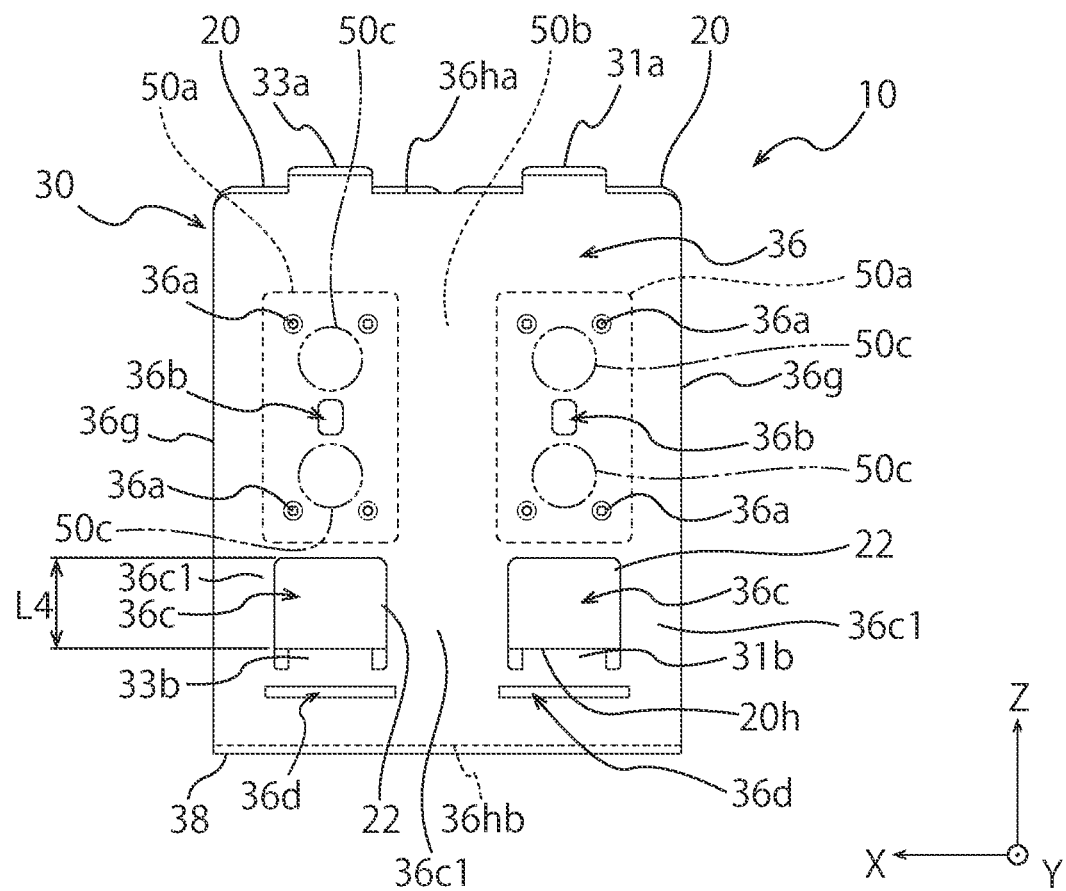
FIG. 3A is a left-side view of the ceramic electronic device shown in FIG. 1A.
Figure 4:
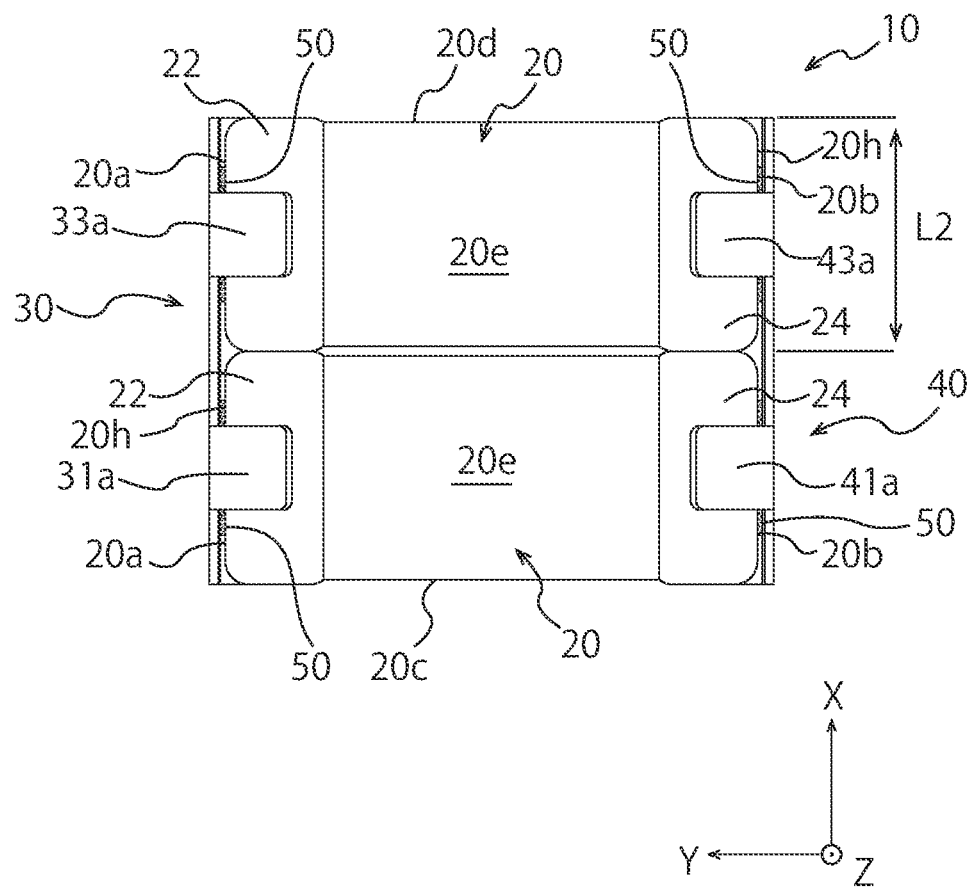
FIG. 4 is a top view of the ceramic electronic device shown in FIG. 1A and FIG. 1B.

As shown in FIG. 2A, the electrode facing portion 36 has a substantially rectangular flat shape having a pair of terminal first sides 36g approximately parallel to the chip first sides 20g perpendicular to the mount surface and a pair of terminal second sides 36ha and 36hb approximately parallel to the chip second sides 20h parallel to the mount surface as shown in FIG. 3A.

Figure 3B:
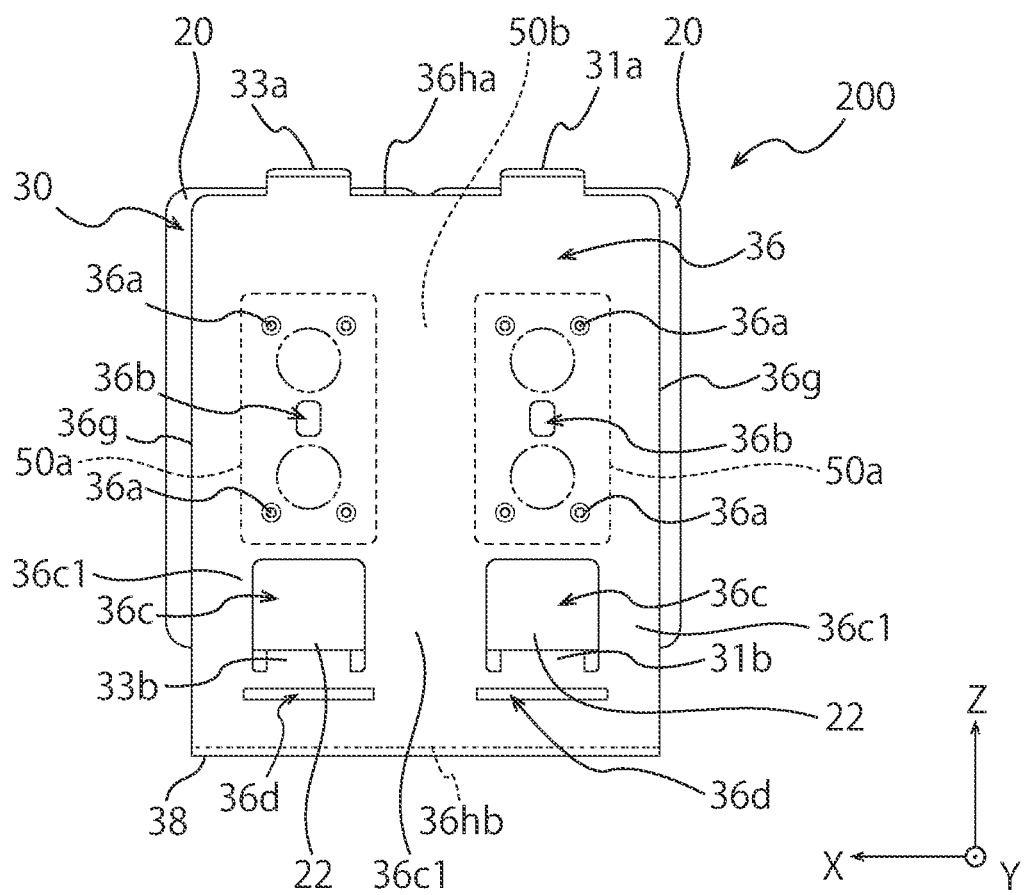
FIG. 3B is a left-side view of a ceramic electronic device according to a variation of the embodiment shown in FIG. 3A.

As shown in FIG. 3A and FIG. 3B (First Variation), the terminal second sides 36ha and 36hb parallel to the mount surface have a length that is several times plus or minus alpha of a length L2 (see FIG. 4) of the chip second sides 20h arranged in parallel to the terminal second sides 36ha and 36hb. That is, the electrode facing portion 36 has a width in the X-axis that may be equal to, slightly shorter, or slightly longer than a length obtained by multiplying the number and X-axis width of each capacitor chip 20 contained in the capacitor 10 shown in FIG. 3A or a capacitor 200 shown in FIG. 3B.

For example, the capacitor 200 according to First Variation shown in FIG. 3B includes two capacitor chips 20, and terminal second sides 36ha and 36hb parallel to a mount surface have a length that is shorter than a double of a length L2 of a chip second side 20h arranged in parallel to the terminal second sides 36ha and 36hb. Incidentally, the capacitor 200 is the same as the capacitor 10 shown in FIG. 1A to FIG. 6 except that the chip second sides of the capacitor chips 20 have a length that is longer than a length of the chip second sides 20h of the capacitor chips 20 according to the embodiment.

On the other hand, the capacitor 10 according to First Embodiment shown in FIG. 3A includes two capacitor chips 20, and the terminal second sides 36ha and 36hb parallel to the mount surface have a length that is the same as or slightly longer than a double of a length L2 of the chip second side 20h arranged in parallel to the terminal second sides 36ha and 36hb. As shown in FIG. 1A, a capacitor chip that can be combined with the metal terminals 30 and 40 does not have only one size, and the metal terminals 30 and 40 can constitute an electronic device correspondingly with multiple kinds of capacitor chips 20 having different lengths in the X-axis direction.

The electrode facing portion 36 is electrically and mechanically connected with the first terminal electrodes 22 formed on the first end surfaces 20a facing the electrode facing portion 36. For example, the electrode facing portion 36 and the first terminal electrodes 22 are connectable with each other by arranging a conductive connection member 50, such as solder and conductive adhesive, in a space between the electrode facing portion 36 and the first terminal electrodes 22 shown in FIG. 2B.

Joint regions 50a are determined as a region where the connection member 50 joins the electrode facing portion 36 and the end surfaces of the first terminal electrodes 22. A non-joint region 50b is determined as a region where the electrode facing portion 36 and the end surfaces of the first terminal electrodes 22 are not joined without the connection member 50, and where a space exists between the electrode facing portion 36 and the end surfaces of the first terminal electrodes 22. The space between the electrode facing portion 36 and the end surfaces of the first terminal electrodes 22 in the non-joint region 50b has a thickness that is approximately equal to a thickness of the connection member 50. In the present embodiment, the connection member 50 has a thickness that is determined based on a height of protrusions 36a mentioned below or so. The height of the joint regions 50a in the Z-axis direction shown in FIG. 2A corresponds to a first predetermined height.

In the present embodiment, first through holes 36b (see FIG. 1A) are formed on a part of the electrode facing portion 36 facing the first end surfaces 20a. Two first through holes 36b are formed correspondingly with the capacitor chips 20 contained in the capacitor 10, but any shape and number of the first through holes 36b may be formed. In the present embodiment, each of the first through holes 36b is formed in an approximately central part of the joint region 50a.

As shown in FIG. 3A, each of the joint regions 50a is formed by applying the connection member 50 (see FIG. 2A) to initial application regions 50c respectively positioned both sides of the first through hole 36b in the Z-axis direction. That is, after the connection member 50 is applied, each of the joint regions 50a is formed in such a manner that the connection member 50 applied on the initial application regions 50c spreads out by bringing a heating element into contact with the outer surface of the electrode facing portion 36 and pushing it against the end surface of the chip 20. The non-joint region 50b is a region where the connection member 50 is not spread out. In the present embodiment, a total area of the non-joint region 50b between the electrode facing portion 36 and the end surfaces of the terminal electrodes 22 in the Y-axis direction is larger than $3/10$, preferably $½$ to 10, of a total area of the joint regions 50a.

In the present embodiment, the connection member 50 composed of solder forms a solder bridge between a periphery of the first through hole 36b and the first terminal electrode 22, and the electrode facing portion 36 and the first terminal electrode 22 can thereby be joined strongly. Moreover, an application state of the connection member 50 in the joint region 50a can be observed from outside via the first through hole 36b. Moreover, bubbles contained in the connection member 50, such as solder, can be released via the first through hole 36b. This stabilizes the joint even if the amount of the connection member 50, such as solder, is small.

The electrode facing portion 36 is provided with protrusions 36a protruding toward the first end surfaces 20a of the capacitor chips 20 and touching the first end surfaces 20a so that the protrusions 36a surround each of the first through holes 36b. In addition, the protrusions 36a may be formed outside the initial application regions 50c, or the initial application regions 50c may be positioned between the protrusions 36a and the first through hole 36b. Incidentally, the initial application region 50c may protrude from between the protrusion 36a and the first through hole 36b.

The protrusions 36a reduce a contact area between the electrode facing portion 36 and the first terminal electrodes 22. This makes it possible to prevent vibrations generated in the chip capacitors 20 from traveling to the mount board via the first metal terminal 30 and prevent an acoustic noise of the ceramic capacitor 10.

The protrusions 36a are formed around each of the first through holes 36b, and the joint region 50a formed by the spread of the connection member 50, such as solder, can thereby be adjusted. In the present embodiment, each of the joint regions 50a has a periphery positioned slightly outside the protrusions 36a. In particular, as shown in FIG. 1A, a lower edge of each joint region 50a in the Z-axis direction is positioned near an upper opening edge of a second through hole (opening) 36c mentioned below.

In such a capacitor 10, an acoustic noise can be prevented while a connection strength between the electrode facing portion 36 and the first terminal electrodes 22 is adjusted in an appropriate range. Incidentally, four protrusions 36a are formed around one first through hole 36b in the capacitor 10, but any number and arrangement of the protrusions 36a may be employed.

The electrode facing portion 36 is provided with second through holes (openings) 36c respectively having a periphery portion connected with the lower arm portion 31b or 33b, which is one of multiple pairs of the engagement arm portions 31a, 31b, 33a, and 33b. The second through holes 36c are positioned closer to the mount portion 38 than the first through holes 36b. Unlike the first through holes 36b, the second through holes 36c are not provided with any connection member, such as solder. That is, the second through holes 36c are formed in the non-joint region 50b.

In the first metal terminal 30, non-opening regions 36c1 are located on both sides of each second through hole 36c in the X-axis direction with the lower arm portion 31b (33b) supporting the capacitor chip 20. The non-opening regions 36c1 function as the non-joint region 50b between the first metal terminal 30 and the terminal electrodes 22 and have an easily deformable shape. The first metal terminal 30 can thereby effectively demonstrate a reduction effect on stress generated in the capacitor 10 and an absorption effect on vibration of the capacitor chips 20. Thus, the capacitor 10 having the first metal terminal 30 can favorably prevent an acoustic noise and have a favorable connection reliability with the mount board when being mounted.

The second through holes 36c have any shape, but preferably have an opening width in the width direction (a parallel direction (X-axis direction) to the terminal second sides 36ha and 36hb) that is wider than the first through holes 36b. When the second through holes 36c have a wide opening width, the first metal terminal 30 can effectively enhance a reduction effect on stress and a prevention effect on acoustic noise. When the first through holes 36b have an opening width that is narrower than the second through holes 36c, the connection member does not spread excessively. As a result, it is possible to prevent an excessive rise in connection strength between the capacitor chips 20 and the electrode facing portion 36 and prevent an acoustic noise.

As shown in FIG. 2A, the non-joint regions 50b, where the connection member 50 does not exist between the electrode facing portion 36 and the end surfaces of the terminal electrodes 22, are present in the non-opening regions 36c1 of the electrode facing portion 36 within a height L4 (second predetermined height) of the second through holes 36c in the Z-axis direction shown in FIG. 3A. In the present embodiment, the height L4 (second predetermined height) of the second through holes 36c in the Z-axis direction substantially corresponds to a height of the non-joint regions 50b in the Z-axis direction located below the joint regions 50a in the Z-axis direction. The height L4 may, however, be smaller than a height of the non-joint regions 50b in the Z-axis direction.

In the present embodiment, each of the second through holes 36c formed per chip 20 has a width in the X-axis direction that is preferably smaller than a width of each chip 20 in the X-axis direction. In the present embodiment, each of the second through holes 36c has a width in the X-axis direction that is preferably 1/6 to 5/6, more preferably 1/3 to 2/3, of a width of each chip 20 in the X-axis direction.

In the electrode facing portion 36, the second through hole 36c connected with the lower arm portion 31b (33b) is formed with a predetermined distance in the height direction against the terminal second side 36hb connected with the mount portion 38, and slits 36d are formed between the second through holes 36c and the terminal second side 36hb.

In the electrode facing portion 36, each of the slits 36d is formed between a connection position of the lower arm portion 31b (33b) positioned near the mount portion 38 with the electrode facing portion 36 (the lower side of the periphery of the second through hole 36c) and the terminal second side 36hb connected with the mount portion 38. The slits 36d extend in parallel to the terminal second sides 36ha and 36hb. The slits 36d can prevent a solder used at the time of mounting the capacitor 10 on a mount board from creeping up on the electrode facing portion 36 and prevent a formation of a solder bridge connected with the lower arm portions 31b and 33b or the first terminal electrodes 22. Thus, the capacitor 10 with the slits 36d demonstrates a prevention effect on acoustic noise.

As shown in FIG. 1A and FIG. 2A, the engagement arm portions 31a, 31b, 33a, and 33b of the first metal terminal 30 extend from the electrode facing portion 36 to the third or fourth side surface 20e or 20f (chip side surface of the capacitor chips 20). The lower arm portion 31b (or lower arm portion 33b), which is one of the engagement arm portions 31a, 31b, 33a, and 33b, is formed by being bent from the lower edge of the second through hole 36c in the Z-axis direction formed on the electrode facing portion 36.

Figure 1B:
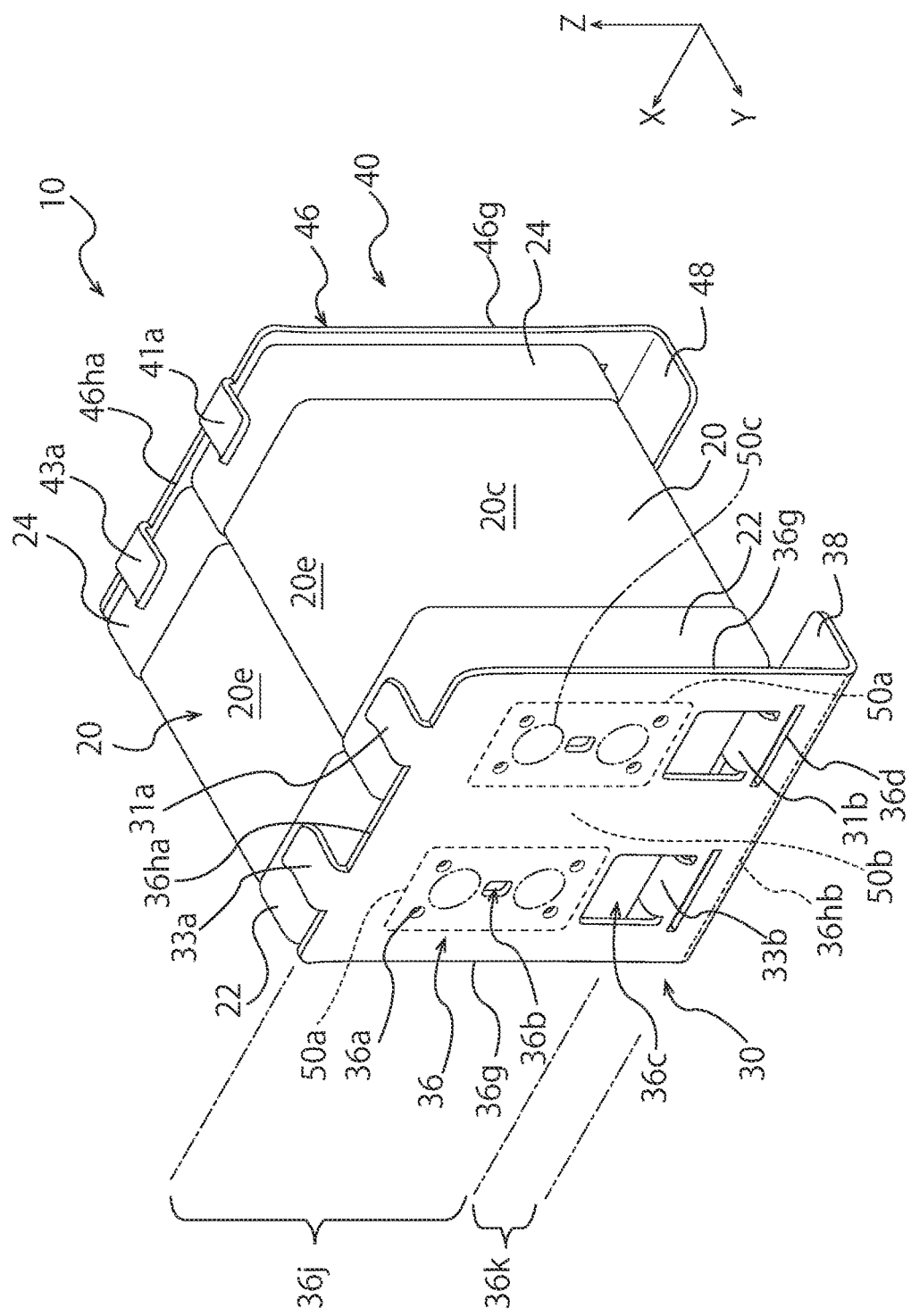
FIG. 1B is a schematic perspective view illustrating a ceramic electronic device according to a variation of the embodiment shown in FIG. 1A.

The upper arm portion 31a (or upper arm portion 33a), which is another one of the engagement arm portions 31a, 31b, 33a, and 33b, is formed by being bent from the terminal second side 36ha at the upper part of the electrode facing portion 36 (positive side in the Z-axis direction). In the present embodiment, the upper arm portion 31a (or upper arm portion 33a) has a width in the X-axis direction that is approximately the same as a width of the lower arm portion 31b (or lower arm portion 33b) in the X-axis direction. As shown in FIG. 1B, however, the upper arm portion 31a (or upper arm portion 33a) may have a width in the X-axis direction that is different from a width of the lower arm portion 31b (or lower arm portion 33b) in the X-axis direction. In the example of FIG. 1B, the upper arm portion 31a (or upper arm portion 33a) has a width in the X-axis direction that is smaller than a width of the lower arm portion 31b (or lower arm portion 33b) in the X-axis direction, but the upper arm portion 31a (or upper arm portion 33a) may have a width in the X-axis direction that is larger than a width of the lower arm portion 31b (or lower arm portion 33b) in the X-axis direction.

As shown in FIG. 1A, the electrode facing portion 36 has a plate body part 36j and a terminal connection part 36k. The plate body part 36j faces the first end surfaces 20a of the capacitor chips 20 and is positioned at a height overlapping with the first end surfaces 20a. The terminal connection part 36k is positioned below the plate body part 36j and is located at a position connecting between the plate body part 36j and the mount portion 38.

The second through holes 36c are formed so that their periphery portions range the plate body part 36j and the terminal connection part 36k. The lower arm portions 31b and 33b extend from the terminal connection part 36k. That is, bases of the lower arm portions 31b and 33b are connected with lower sides (opening peripheries near the mount portion 38) of approximately rectangular periphery portions of the second through holes 36c.

The lower arm portions 31b and 33b bend and extend inward from the bases in the Y-axis direction (toward the central parts of the chips 20), touch the fourth side surfaces 20f of the capacitor chips 20, and support the capacitor chips 20 from below (see FIG. 2A). Incidentally, the lower arm portions 31b and 33b may tilt upward in the Z-axis direction from the lower sides of the periphery portions of the second through holes 36c before the chips 20 are attached. This enables the lower arm portions 31b and 33b to touch the fourth side surfaces 20f of the chips 20 due to the resilience of the lower arm portions 31b and 33b.

Lower edges (chip second sides 20h below) of the first end surfaces 20a of the capacitor chips 20 are positioned slightly above the lower sides of the periphery portions of the second through holes 36c (bases of the lower arm portions 31b and 33b). When viewing the capacitor chips 20 from the Y-axis direction as shown in FIG. 3A, the lower edges (chip second sides 20h below) of the first end surfaces 20a of the capacitor chips 20 can be recognized from the side of the capacitor 10 via the second through holes 36b.

As shown in FIG. 1A, a pair of upper arm portion 31a and lower arm portion 31b holds one capacitor chip 20, and a pair of upper arm portion 33a and lower arm portion 33b holds another one capacitor chip 20. Since a pair of upper arm portion 31a and lower arm portion 31b (or upper arm portion 33a and lower arm portion 33b) holds one capacitor chip 20, not multiple capacitor chips 20, the first metal terminal 30 can definitely hold each of the capacitor chips 20.

The pair of upper arm portion 31a and lower arm portion 31b (33a and 33b) does not hold the capacitor chip 20 from both ends of the chip second sides 20h (shorter sides of the first end surface 20a), but holds the capacitor chip 20 from both ends of the chip first sides 20g (longer sides of the first end surface 20a). This increases a distance between the upper arm portion 31a (33a) and the lower arm portion 31b (33b) and easily absorbs vibrations of the capacitor chips 20. Thus, the capacitor 10 can favorably prevent an acoustic noise. Incidentally, since the lower arm portions 31b and 33b extend from the terminal connection part 36k, the capacitor chips 20 have a short transmission path between the first terminal electrodes 22 and the mount board, compared to when the lower arm portions 31b and 33b are connected with the plate body part 36j.

The mount portion 38 is connected with the terminal second side 36hb located below in the electrode facing portion 36 (negative side in the Z-axis direction). The mount portion 38 extends from the terminal second side 36hb located below toward the capacitor chips 20 (negative side in the Y-axis direction) and is bent approximately perpendicularly to the electrode facing portion 36. To prevent an excessive scattering of a solder used at the time of mounting the capacitor chips on a board, the top surface of the mount portion 38 (surface of the mount portion 38 closer to the capacitor chips 20) preferably has a solder wettability that is lower than a solder wettability of the bottom surface of the mount portion 38.

The mount portion 38 of the capacitor 10 is mounted on a mount surface, such as a mount board, in a position facing downward as shown in FIG. 1A and FIG. 2A. Thus, a height of the capacitor 10 in the Z-axis direction is a height of the capacitor 10 when being mounted. In the capacitor 10, the mount portion 38 is connected with the terminal second side 36hb on one side of the electrode facing portion 36, and the upper arm portions 31a and 33a are connected with the terminal second side 36ha on the other side of the electrode facing portion 36. Thus, the capacitor 10 has no unnecessary part of the length in the Z-axis direction and is advantageous in reducing its height.

Figure 5:
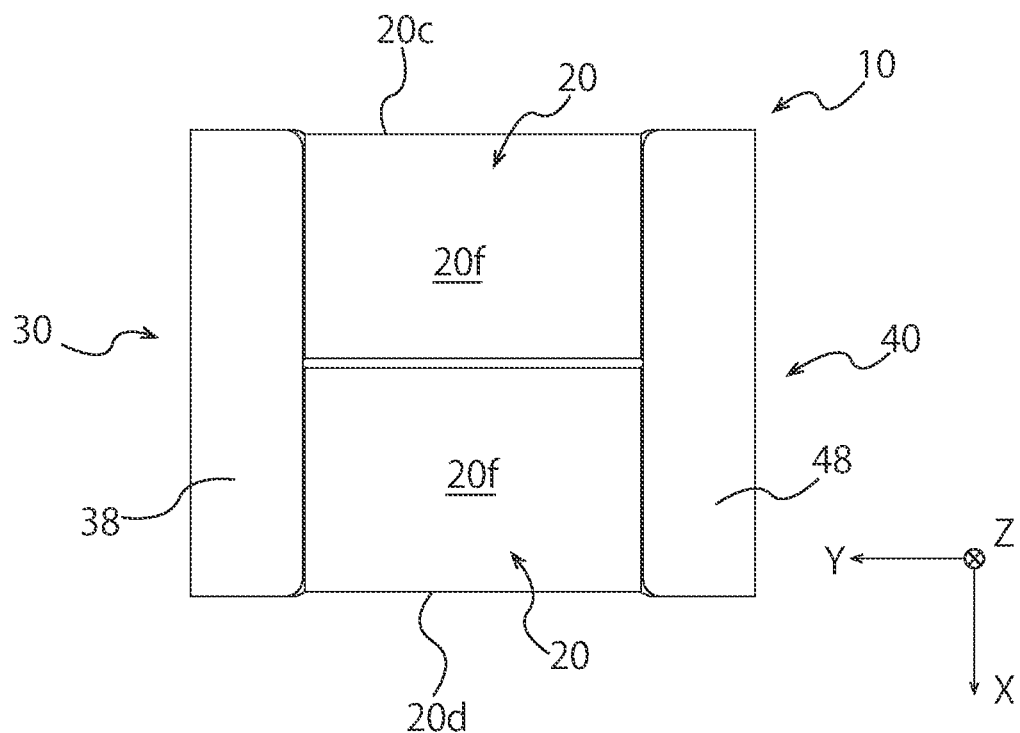
FIG. 5 is a bottom view of the ceramic electronic device shown in FIG. 1A and FIG. 1B.

Since the mount portion 38 is connected with the terminal second side 36hb on one side of the electrode facing portion 36, the capacitor 10 can have a small projection area in the Z-axis direction and have a small mount area, compared to prior arts where the mount portion 38 is connected with the terminal first sides 36g of the electrode facing portion 36. Since the third and fourth side surfaces 20e and 20f having small areas among the first to fourth side surfaces 20c to 20f of the capacitor chips 20 are arranged in parallel to the mount surface as shown in FIG. 1A, FIG. 5, etc., the capacitor 10 can have a small mount area even if the capacitor chips 20 are not overlapped with each other in the height direction.

As shown in FIG. 1A and FIG. 2A, the second metal terminal has an electrode facing portion 46, a plurality of pairs of engagement arm portions 41a, 41b, 43a, and 43b, and a mount portion 48. The electrode facing portion 46 faces the second terminal electrodes 24. The engagement arm portions 41a, 41b, 43a, and 43b sandwich and hold the capacitor chips 20 from both ends of the chip first sides 20g in the Z-axis direction. The mount portion 48 extends from the electrode facing portion 46 toward the capacitor chips 20 and is at least partially approximately perpendicular to the electrode facing portion 46.

As is the case with the electrode facing portion 36 of the first metal terminal 30, the electrode facing portion 46 of the second metal terminal 40 has a pair of terminal first sides 46g approximately parallel to the chip first sides 20g and terminal second sides 46ha and 46hb approximately parallel to the chip second sides 20h. The electrode facing portion 46 includes protrusions (not shown), first through holes (not shown), second through holes (not shown), and slits 46d (see FIG. 6), all of which are respectively similar to the protrusions 36a, the first through holes 36b, the second through holes 36c, and the slits 36d provided in the electrode facing portion 36.

In the present embodiment, as shown in FIG. 2B, the electrode facing portion 36 of the first metal terminal 30 is warped from the end surface of the terminal electrode 22 toward the arm portions 31a and 31b (holding portions) in the non-joint regions 50b. In the non-joint regions 50b, a non-joint gap 50d between the electrode facing portion 36 and the end surface of the terminal electrode 22 consequently becomes larger toward the arm portions 31a and 31b.

A warp angle θa (upper one in the Z-axis direction) of the electrode facing portion 36 from the end surface of the terminal electrode 22 in the non-joint region 50b may be equal to or different from a warp angle θb (lower one in the Z-axis direction) of the electrode facing portion 36 from the end surface of the terminal electrode 22 in the non-joint region 50b. A maximum width of the non-joint gap 50d is 1.2 to 7 times larger than a minimum width of the non-joint gap 50d.

Incidentally, a minimum width of the non-joint gap 50d is as large as a thickness of the connection member 50. In this range, the arm portions 31a and 31b continuing to the non-joint region 50b can have a favorable elasticity and favorably hold the capacitor chip 20, the metal terminal 30 can easily elastically be deformed, and an acoustic noise phenomenon can effectively be prevented.

As shown in FIG. 1A, the second metal terminal 40 is disposed symmetrically to the first metal terminal 30 and is different from the first metal terminal 30 in arrangement against the capacitor chips 20. The second metal terminal 40 is, however, different from the first metal terminal 30 only in arrangement against the capacitor chips 20 and has a similar shape to the first metal terminal 30. Thus, the second metal terminal 40 is not described in detail.

The first metal terminal 30 and the second metal terminal 40 are composed of any conductive metal material, such as iron, nickel, copper, silver, and an alloy thereof. In particular, the first and second metal terminals 30 and 40 are preferably composed of copper in consideration of restraining resistivity of the first and second metal terminals 30 and 40 and reducing ESR of the capacitor 10.

Hereinafter, a manufacturing method of the capacitor 10 is described.

Manufacturing Method of Multilayer Capacitor Chip 20

In a manufacture of the multilayer capacitor chip 20, a laminated body is prepared by laminating green sheets (to be the dielectric layers 28 after firing) with electrode patterns to be the internal electrode layers 26 after firing, and a capacitor element body is obtained by pressurizing and firing the obtained laminated body. Moreover, the first and second terminal electrodes 22 and 24 are formed on the capacitor element body by baking and plating a terminal electrode paint, and the capacitor chip 20 is thereby obtained.

A green sheet paint and an internal electrode layer paint, which are raw materials of the laminated body, a raw material of the terminal electrodes, firing conditions of the laminated body and the electrodes, and the like are not limited, and can be determined with reference to known manufacturing methods or so. In the present embodiment, ceramic green sheets whose main component is barium titanate are used as a dielectric material. In the terminal electrodes, a Cu paste is immersed and baked to form a baked layer, and a Ni plating treatment and a Sn plating treatment are conducted, whereby Cu baked layer/Ni plating layer/Sn plating layer is formed.

Manufacturing Method of Metal Terminals 30 and 40

In a manufacture of the first metal terminal 30, a metal plate is firstly prepared. The metal plate is composed of any conductive metal material, such as iron, nickel, copper, silver, and an alloy thereof. Next, the metal plate is machined to form intermediate members having shapes of the engagement arm portions 31a to 33b, the electrode facing portion 36, the mount portion 38, and the like.

Next, a metal film is formed by plating on the surfaces of the intermediate members formed by machining, and the first metal terminal 30 is obtained. Any material, such as Ni, Sn, and Cu, is used for the plating. In the plating treatment, a resist treatment against a top surface of the mount portion 38 can prevent the plating from attaching to the top surface of the mount portion 38. This makes it possible to generate a difference in solder wettability between the top surface and the bottom surface of the mount portion 38. Incidentally, a similar difference can be generated by conducting a plating treatment against the entire intermediate members for formation of a metal film and removing only the metal film formed on the top surface of the mount portion 38 using a laser exfoliation or so.

Incidentally, in the manufacture of the first metal terminals 30, a plurality of first metal terminals 30 may be formed in a state of being connected with each other from a metal plate continuing in belt shape. The plurality of first metal terminals 30 connected with each other is cut into pieces before or after being connected with the capacitor chip 20. Incidentally, the warp of the metal terminal 30 in the non-joint region 50b shown in FIG. 2B may be formed at the same time when or after a plurality of first metal terminals 30 is formed in a mutually connected state from a metal plate member continuing in a belt state. The second metal terminal 40 is manufactured in a similar manner to the first metal terminal 30.

Assembly of Capacitor 10

Two capacitor chips 20 obtained in the above-mentioned manner are prepared and held so that the second side surface 20d and the first side surface 20c are arranged to touch each other as shown in FIG. 1A and FIG. 1B. Then, a rear surface of the first metal terminal 30 faces the end surfaces of the first terminal electrodes 22 in the Y-axis direction, and the second metal terminal 40 faces the end surfaces of the second terminal electrodes 24 in the Y-axis direction.

At this time, the connection member 50 (see FIG. 2A and FIG. 2B), such as solder, is applied to the initial application regions 50c shown in FIG. 1A and FIG. 3A on the end surfaces of the first terminal electrodes 22 in the Y-axis direction or on the rear surface of the first metal terminal 30. The connection member 50 (see FIG. 2A and FIG. 2B), such as solder, is similarly applied at positions corresponding with the initial application regions 50c shown in FIG. 1A, FIG. 1B, and FIG. 3A on the end surfaces of the second terminal electrodes 24 in the Y-axis direction or on the rear surface of the second metal terminal 40.

Thereafter, the joint region 50a is formed in such a manner that the connection member 50 applied on the initial application regions 50c spreads out by pushing a heating element (not illustrated) from the outer surface of the electrode facing portion 36 (the same applies to the electrode facing portion 46) against the end surfaces of the chips 20. The non-joint region 50b is a region where the connection member 50 is not spread out. This allows the first and second metal terminals 30 and 40 to be electrically and mechanically connected with the first and second terminal electrodes 22 and 24 of the capacitor chips 20. Then, the capacitor 10 is obtained.

In the capacitor 10 obtained in this way, a height direction (Z-axis direction) of the capacitor 10 is identical to directions of the chip first sides 20g (longer sides of the capacitor chips 20), and the mount portions 38 and 48 are formed by being bent from the terminal second side 36hb toward below the capacitor chips 20. Thus, the capacitor 10 has a small projection area in the height direction of the capacitor 10 (see FIG. 4 and FIG. 5), and can have a small mount area.

In the capacitor 10, a plurality of capacitor chips 20 is arranged side by side in the parallel direction to the mount surface. In the capacitor 10, for example, only one capacitor chip 20 is held between a pair of engagement arm portions 31a and 31b in the engagement direction (Z-axis direction). Thus, the capacitor 10 has a high connection reliability between the capacitor chips 20 and the metal terminals 30 and 40, and has a high reliability for impact and vibrations.

Moreover, since a plurality of capacitor chips 20 is arranged and laminated in the parallel direction to the mount surface, the capacitor 10 has a short transmission path and can achieve a low ESL. Since the capacitor chips 20 are held perpendicularly to the lamination direction of the capacitor chips 20, the first and second metal terminals 30 and 40 can hold the capacitor chips 20 without any problems even if the length L2 of the chip second side 20h of the capacitor chip 20 varies due to change in the lamination number of the internal electrode layers 26 and the dielectric layers 28 of the capacitor chips 20 to be held. Since the first and second metal terminals 30 and 40 can hold the capacitor chips 20 having various lamination numbers of the internal electrode layers 26 and the dielectric layers 28, the capacitor 10 can flexibly respond to design change.

In the capacitor 10, the upper arm portion 31a (33a) and the lower arm portion 31b (33b) sandwich and hold the capacitor chip 20 from both ends of the chip first sides 20g (longer sides of the first end surface 20a of the capacitor chip 20). Thus, the first and second metal terminals 30 and 40 can effectively demonstrate a restraint effect on stress, prevent a transmission of vibrations from the capacitor chips 20 to the mount board, and prevent an acoustic noise.

In particular, since the lower arm portion 31b (33b) is formed by being bent from a lower opening edge of the second through hole 36c, the lower arm portion 31b (33b) supporting the capacitor chip 20 and the electrode facing portion 36 (46) supporting the lower arm portion 31b (33b) are elastically easily deformable. Thus, the first and second metal terminals 30 and 40 can effectively demonstrate a reduction effect on stress generated in the capacitor 10 and an absorption effect on vibrations.

Since the lower arm portions 31b and 33b are formed by being bent at the lower opening peripheries of the second through holes 36c, the lower arm portions 31b and 33b of the capacitor 10 can be arranged at overlapped positions with the mount portion 38 when viewed from the perpendicular direction (Z-axis direction) to the mount surface (see FIG. 2A and FIG. 5). Thus, the capacitor 10 can have a wide mount portion 38 and is advantageous in downsizing.

Since the first through holes 36b are formed, the capacitor 10 can easily recognize a connection state between the first and second metal terminals 30 and 40 and the capacitor chips 20 from outside, and it is thereby possible to reduce variation in quality and improve non-defective rate.

In the capacitor 10 according to the present embodiment, a pair of engagement arm portions 31a and 31b (holding portions with elasticity) and a pair of engagement arm portions 33a and 33b (holding portions with elasticity) of the metal terminal 30 sandwich and hold the chips 20 from both sides in the Z-axis direction (the same applies to the engagement arm portions 41a, 41b, 43a, and 43b and the metal terminal 40), and the metal terminal 30 (40) and the chips 20 are further connected by the connection member 50, such as solder, (see FIG. 2A and FIG. 2B) in the joint regions 50a in a predetermined range, whereby the chips 20 and the metal terminals 30 and 40 can be connected securely and firmly.

The non-joint region 50b, which does not connect between the electrode facing portion 36 (46) and the end surfaces of the terminal electrode 22 (24), is formed between the peripheries of the joint regions 50a and the engagement arm portions 31a, 31b, 33a, and 33b (the same applies to 41a, 41b, 43a, and 43b). In the non-joint region 50b, the electrode facing portion 36 (46) of the metal terminal 30 (40) can freely elastically be deformed without being disturbed by the terminal electrode 22 (24), and stress is reduced. This favorably maintains an elastic property of the engagement arm portions 31a, 31b, 33a, and 33b (41a, 41b, 43a, and 43b) continuing to the non-joint region 50b, and the chips 20 can favorably be held between a pair of engagement arm portions 31a and 31b and between a pair of engagement arm portions 33a and 33b. In addition, the metal terminal 30 (40) is easily elastically deformed, and an acoustic noise phenomenon can be prevented effectively.

A total area of the non-joint regions 50b between the electrode facing portion 36 (46) and the terminal electrodes 22 (24) is larger than 3/10 of a total area of the joint regions 50a and is within a predetermined range. This structure improves the effects of the present embodiment.

In the non-joint region 50b, a non-joint gap 50d being as thick as the connection member 50 is present between the electrode facing portion 36 (46) and the end surface of the terminal electrode 22 (24). In the non joint region 50b, the non-joint gap 50d between the electrode facing portion 36 (46) and the end surface of the terminal electrode 22 (24) becomes larger toward the arm portions 31a, 31b, 33a, and 33b (41a, 41b, 43a, and 43b). In the non-joint region 50b, the electrode facing portion 36 (46) of the metal terminal 30 (40) can thereby freely elastically be deformed without being disturbed by the terminal electrode 22 (24), and stress is reduced. This favorably maintains an elastic property of the engagement arm portions 31a, 31b, 33a, and 33b (41a, 41b, 43a, and 43b) continuing to the non-joint region 50b, and the capacitor chips 20 can favorably be held by the arm portions. In addition, the metal terminal 30 (40) is easily elastically deformed, and an acoustic noise phenomenon can be prevented effectively.

Moreover, as shown in FIG. 3A, the end surfaces of the terminal electrodes 22 (24) of a plurality of chips 20 may be joined side by side with the electrode facing portion 36 (46) in a plurality of joint regions 50a, and the non-joint region 50b is also formed between the joint regions 50a adjacent to each other. In this structure, a plurality of chips 20 is easily connected by a pair of metal terminals 30 and 40, and an acoustic noise phenomenon can be prevented due to existence of the non-joint region 50b existing between the chips 20.

Moreover, in the present embodiment, the electrode facing portion 36 (46) is provided with the second through holes 36c going through the front and back surfaces of the electrode facing portion 36 (46) in the non-joint region 50b. The arm portions 31b and 33b (41b and 43b) extend from the opening peripheries of the second through holes 36c. Since the second through holes 36c are formed, the non-joint region 50b can be formed easily, the arm portions 31b and 33b (41b and 43b) can be formed easily, and the chips 20 are held firmly.

Moreover, in the present embodiment, the protrusions 36a protruding toward the end surface of the terminal electrode 22 (24) are formed on the inner surface of the electrode facing portion 36 (46). This structure can easily control the joint region 50a of the connection member 50 and also easily control a thickness of the joint region 50a. In addition, this structure stabilizes the connection of the connection member even if the amount of the connection member is small.

In the present embodiment, vibrations do not travel from the chips 20 to the metal terminal 30 in the second through holes 36c. Vibrations are easily generated by electrostrictive phenomenon in the chips 20, particularly in a part where the internal electrodes 26 of the chip 20 are laminated via the dielectric layers, but vibrations can be prevented from traveling in the second through holes 36c.

In the present embodiment, as shown in FIG. 2A and FIG. 2B, the non-joint region 50b, where the connection member 50 is not present between the electrode facing portion 36 and the end surfaces of the terminal electrodes 22, is present in the non-opening region 36c1 of the electrode facing portion 36 within a predetermined height L4 in the Z-axis direction corresponding to the second through holes 36c shown in FIG. 3A. In the non-joint region 50b, the electrode facing portion 36 of the metal terminal 30 can freely elastically be deformed without being disturbed by the terminal electrodes 22, and stress is reduced. This favorably maintains an elastic property of the lower arm portions 31b and 33b as the holding portions continuing to the non-opening regions 36c1, and the chips 20 can favorably be held by the lower arm portions 31b and 33b. In addition, the metal terminal 30 is easily elastically deformed, and an acoustic noise phenomenon can be prevented effectively.

Moreover, the lower arm portions 31b and 33b are formed in the second through holes 36c near the mount portion in the present embodiment. In this structure, electrostrictive strain vibrations of the internal electrodes 26 can be prevented from traveling to the metal terminal 30 near the mount portion 38. The lower arm portions 31b and 33b are hard to be influenced by the electrostrictive strain vibrations and can securely hold the chips 20.

In the present embodiment, the lower arm portion 31b (33b) is formed by being bent from an opening edge of the second through hole 36c. In this structure, the second through hole 36c and the lower arm portion 31b (33b) can easily be formed and arranged closely, and it is possible to more effectively prevent a vibration transmission from the chips 20 to the metal terminal 30 and a vibration transmission from the metal terminal 30 to the mount board.

Second Embodiment

Figure 7:
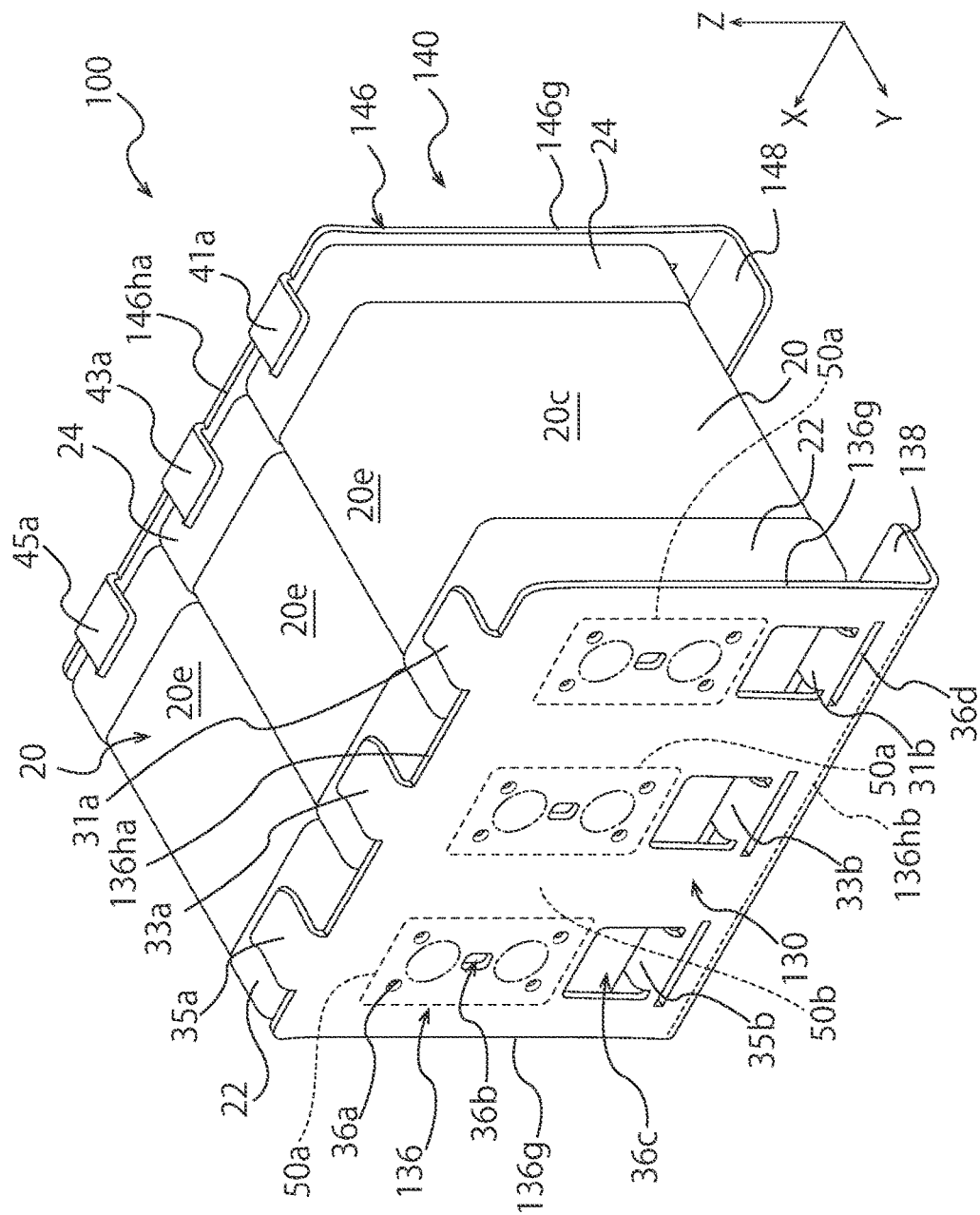
FIG. 7 is a schematic perspective view illustrating a ceramic electronic device according to another embodiment of the present invention.

FIG. 7 is a schematic perspective view of a capacitor 100 according to Second Embodiment of the present invention. FIG. 8 to FIG. 11 are respectively a front view, a left-side view, a top view, and a bottom view of the capacitor 100. As shown in FIG. 7, the capacitor 100 is similar to the capacitor 10 according to First Embodiment except that the capacitor 100 has three capacitor chips 20 and a different number of first through holes 36b or so contained in a first metal terminal 130 and a second metal terminal 140. In the description of the capacitor 100, similar parts to the capacitor 10 are provided with similar references to the capacitor 10 and are not described.

Figure 8:
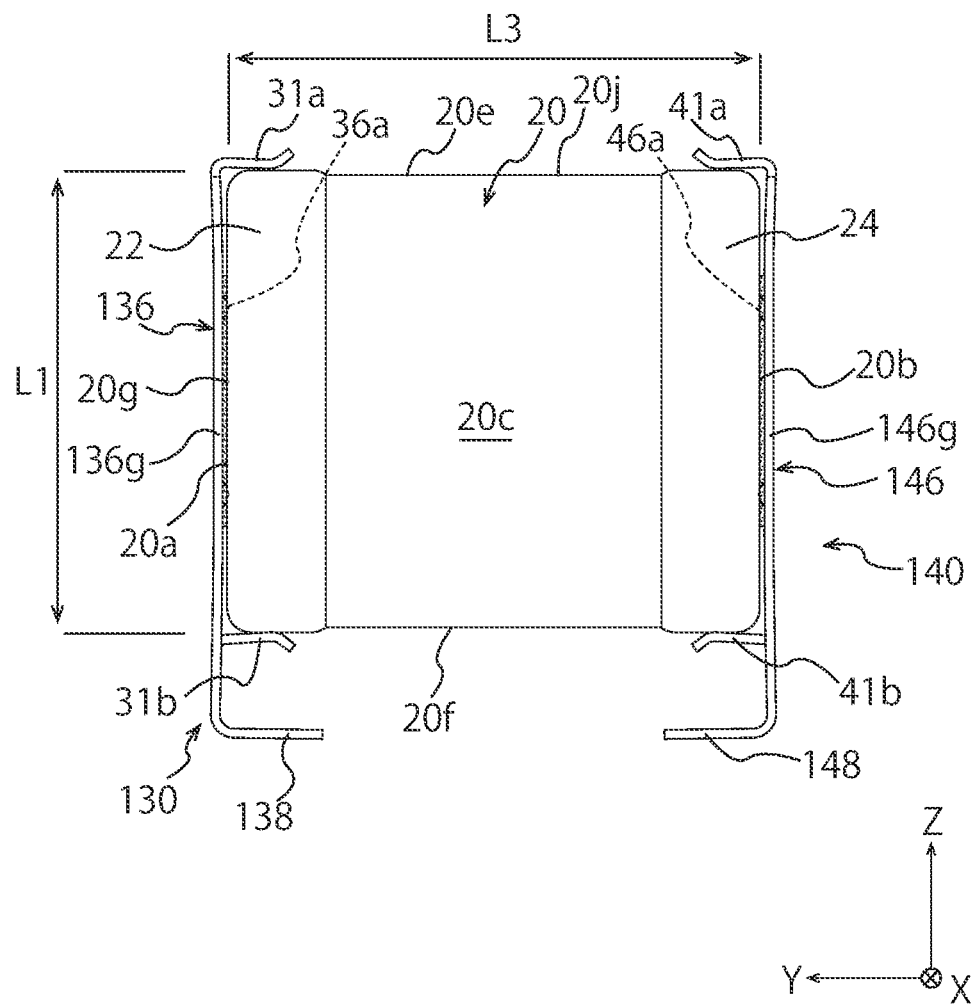
FIG. 8 is a front view of the ceramic electronic device shown in FIG. 7.
Figure 10:
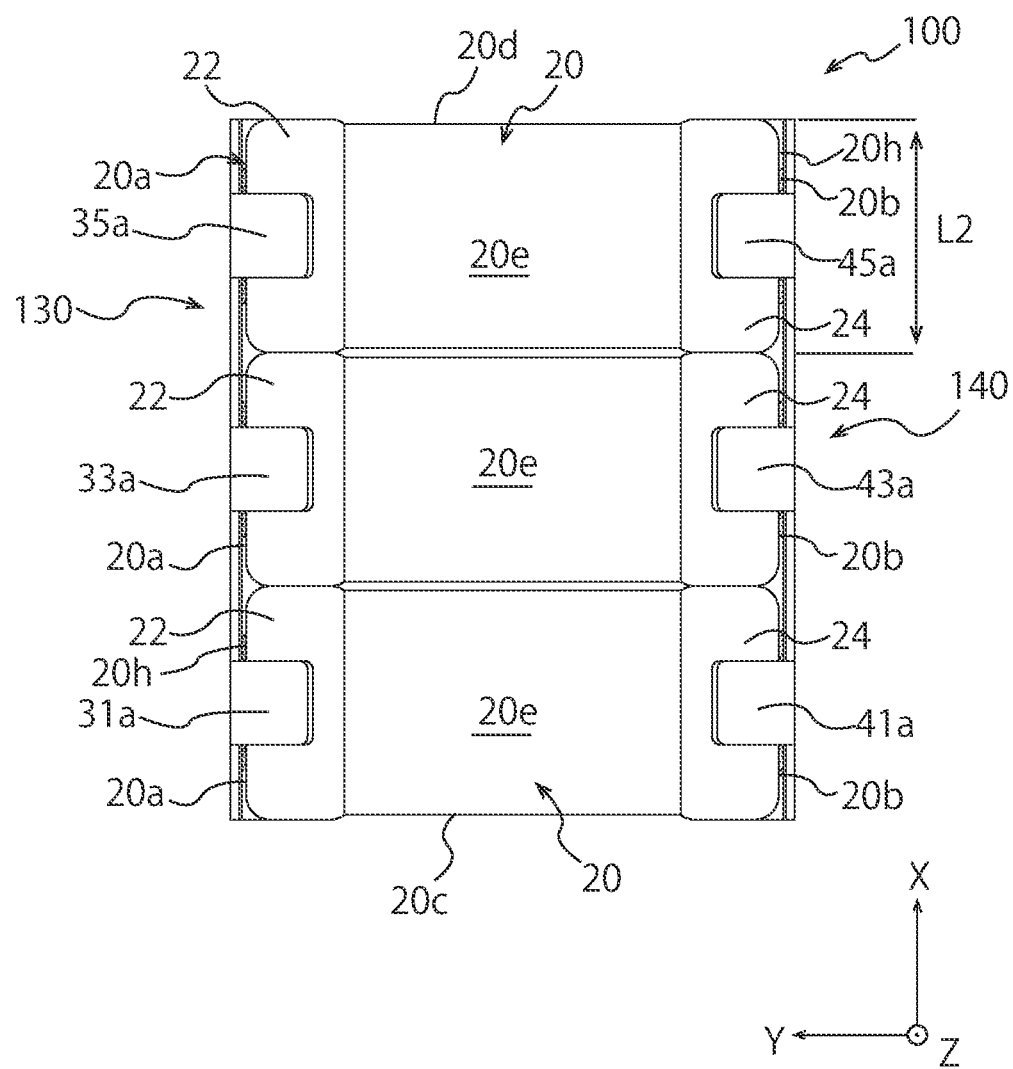
FIG. 10 is a top view of the ceramic electronic device shown in FIG. 7.

As shown in FIG. 7, the capacitor chips 20 contained in the capacitor 100 are similar to the capacitor chips 20 contained in the capacitor 10 shown in FIG. 1A and FIG. 1B. The three capacitor chips 20 contained in the capacitor 100 are arranged so that chip first sides 20g are perpendicular to a mount surface as shown in FIG. 8, and that chip second sides 20h are parallel to a mount surface as shown in FIG. 10. The three capacitor chips 20 contained in the capacitor 100 are arranged in parallel to a mount surface so that the first terminal electrodes 22 of the capacitor chips 20 adjacent to each other are mutually in contact with, and that the second terminal electrodes 24 of the capacitor chips 20 adjacent to each other are mutually in contact with.

The first metal terminal 130 contained in the capacitor 100 has an electrode facing portion 136, three pairs of engagement arm portions 31a, 31b, 33a, 33b, 35a, and 35b, and a mount portion 138. The electrode facing portion 136 faces the first terminal electrodes 22. The three pairs of engagement arm portions 31a, 31b, 33a, 33b, 35a, and 35b hold the capacitor chips 20. The mount portion 138 is bent perpendicularly from a terminal second side 136hb of the electrode facing portion 136 toward the capacitor chips 20.

The electrode facing portion 136 has a substantially rectangular flat shape, and has a pair of terminal first sides 136g approximately parallel to the chip first sides 20g and a pair of terminal second sides 136ha and 136hb approximately parallel to the chip second sides 20h.

Figure 9:
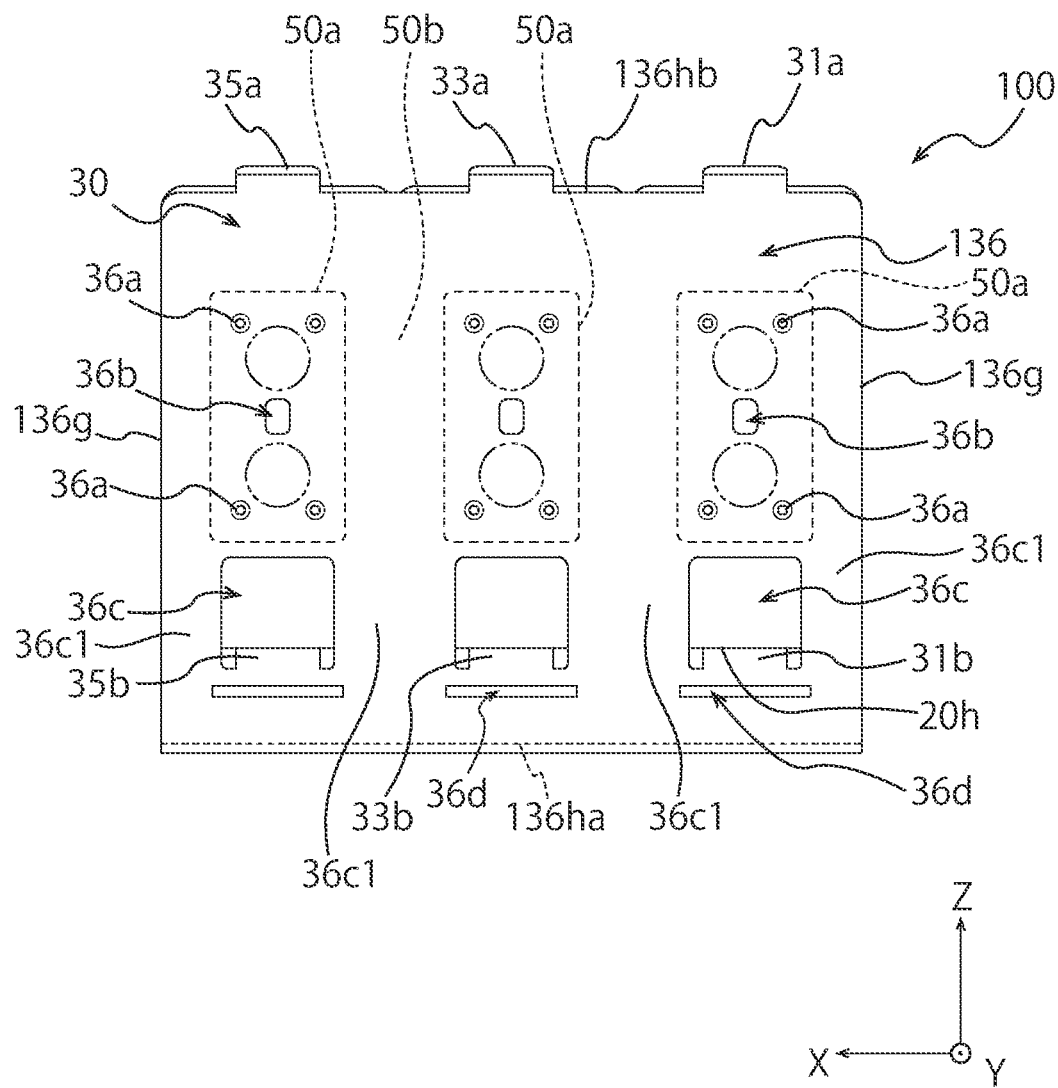
FIG. 9 is a left-side view of the ceramic electronic device shown in FIG. 7.

As is the case with the first metal terminal 30 shown in FIG. 3A, the first metal terminal 130 is provided with the protrusions 36a, the first through holes 36b, the second through holes 36c, and the slits 36d as shown in FIG. 9. The first metal terminal 130 is, however, provided with three first through holes 36b, three second through holes 36c, and three slits 36d, and one first through hole 36b, one second through hole 36c, and one slit 36d correspond with one capacitor chip 20. The first metal terminal 130 is provided with 12 protrusions 36a in total, and the four protrusions 36a correspond with each of the capacitor chips 20.

In the first metal terminal 130, as shown in FIG. 10, the upper arm portion 31a and the lower arm portion 31b hold one of the capacitor chips 20, the upper arm portion 33a and the lower arm portion 33b hold another one of the capacitor chips 20, and the upper arm portion 35a and the lower arm portion 35b hold another one of the capacitor chips 20 that is different from the above two capacitor chips 20. The upper arm portions 31a, 33a, and 35a are connected with the terminal second side 136ha at the upper part of the electrode facing portion 136 (positive side in the Z-axis direction), and the lower arm portions 31b, 33b, and 35b are connected with periphery portions of the second through holes 36c.

Figure 11:
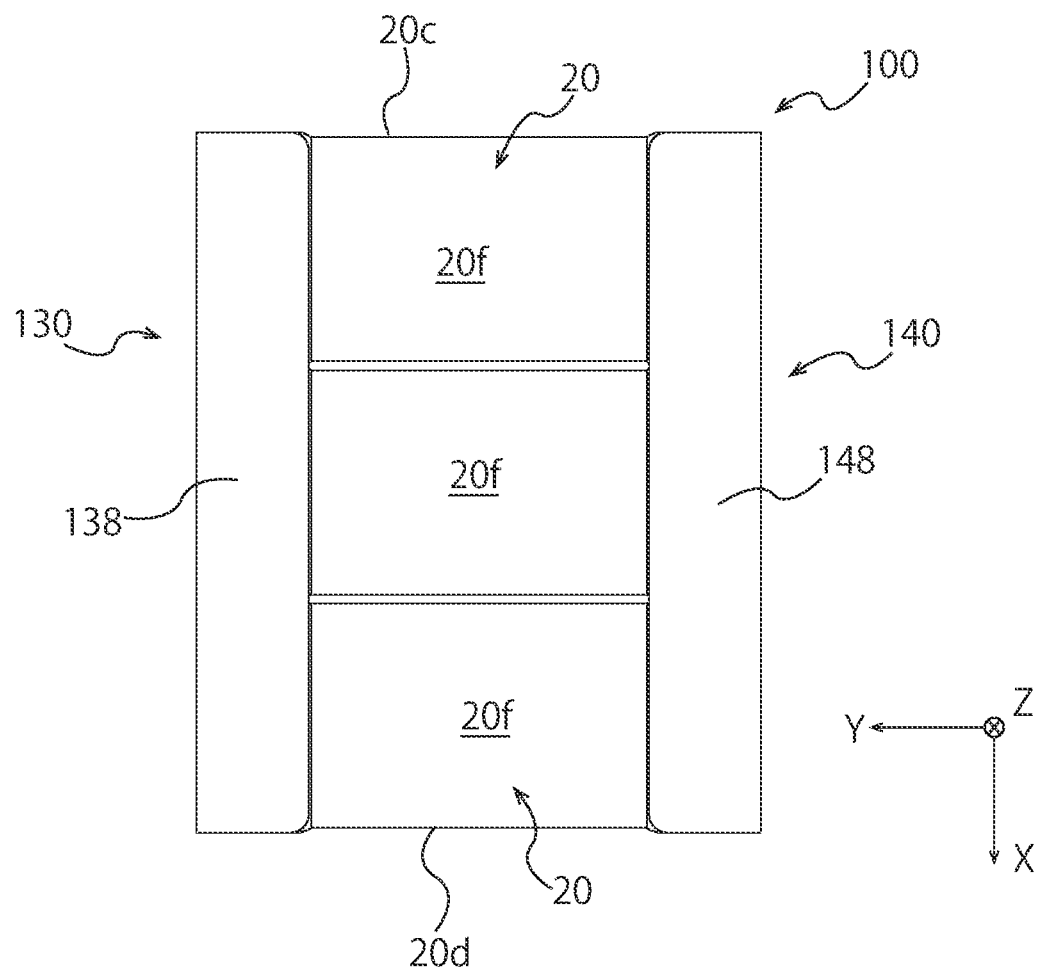
FIG. 11 is a bottom view of the ceramic electronic device shown in FIG. 7.

As shown in FIG. 8 and FIG. 11, the mount portion 138 of the first metal terminal 130 is connected with the terminal second side 136hb at the lower part of the electrode facing portion 136 (negative side in the Z-axis direction). The mount portion 138 extends from the terminal second side 136hb toward the capacitor chips 20 (negative side in the Y-axis direction) and is bent approximately perpendicularly to the electrode facing portion 136.

The second metal terminal 140 has an electrode facing portion 146, a plurality of pairs of engagement arm portions 41a, 43a, and 45a, and a mount portion 148. The electrode facing portion 146 faces the second terminal electrodes 24. The engagement arm portions 41a, 43a, and 45a sandwich and hold the capacitor chips 20 from both ends of the chip first sides 20g in the Z-axis direction. The mount portion 148 extends from the electrode facing portion 146 toward the capacitor chips 20 and is at least partially approximately perpendicular to the electrode facing portion 146.

As is the case with the electrode facing portion 136 of the first metal terminal 130, the electrode facing portion 146 of the second metal terminal 140 has a pair of terminal first sides 146g approximately parallel to the chip first sides 20g and a terminal second side 146ha approximately parallel to the chip second sides 20h, and the electrode facing portion 146 is provided with the protrusions 46a, first through holes, second through holes, and slits. As shown in FIG. 7, the second metal terminal 140 is arranged symmetrically to the first metal terminal 130 and is different from the first metal terminal 130 in arrangement to the capacitor chips 20. The second metal terminal 140 is, however, different from the first metal terminal 130 only in arrangement and has a similar shape to the first metal terminal 130. Thus, the second metal terminal 140 is not described in detail.

The capacitor 100 according to Second Embodiment demonstrates similar effects to those of the capacitor 10 according to First Embodiment. Incidentally, the numbers of upper arm portions 31a to 35a, lower arm portions 31b to 35b, first through holes 36b, second through holes 36c, and slits 36d contained in the first metal terminal 130 of the capacitor 100 are the same as the number of capacitor chips 20 contained in the capacitor 100, but the number of engagement arm portions or so contained in the capacitor 100 is not limited thereto. For example, the first metal terminal 130 may be provided with the first through holes 36b by twice the number of capacitor chips 20 and may be provided with one continuously long slit 36d.

Third Embodiment

Figure 3C:
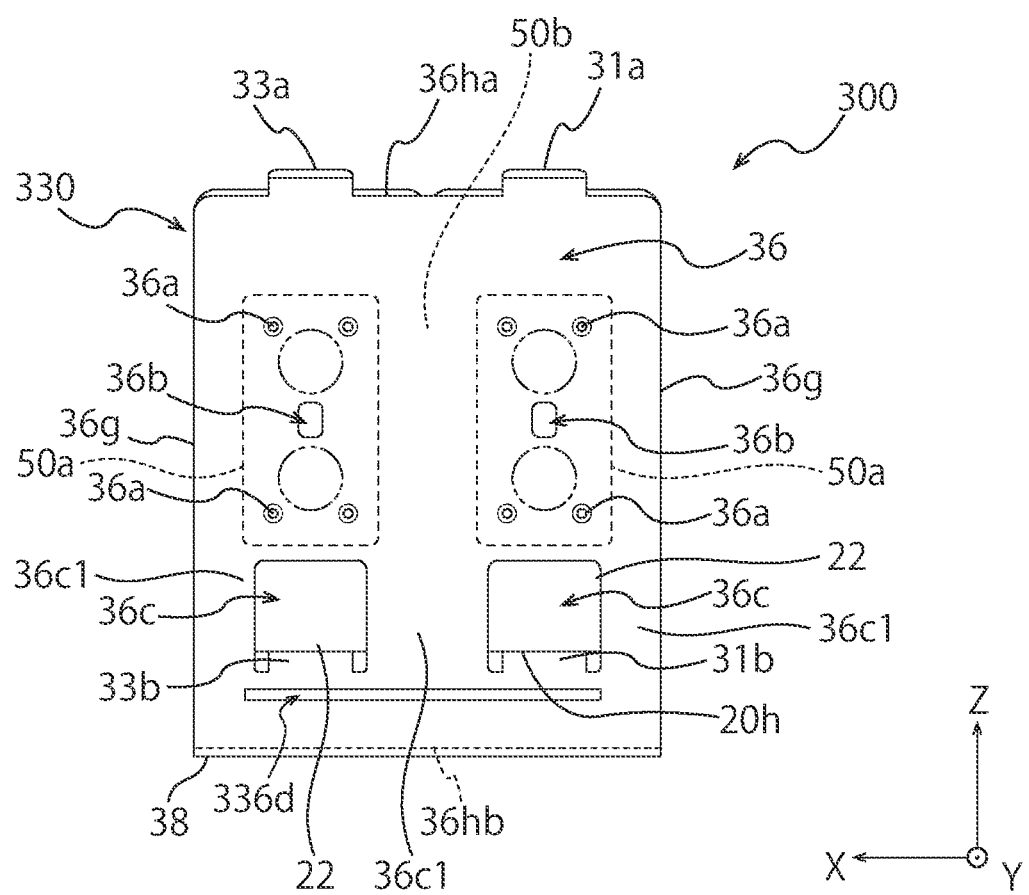
FIG. 3C is a left-side view of a ceramic electronic device according to another embodiment of the present invention.

FIG. 3C is a left-side view illustrating a capacitor 300 according to Third Embodiment of the present invention. The capacitor 300 according to Third Embodiment is similar to the capacitor 10 according to First Embodiment except for shapes of slits 336d formed on first and second metal terminals 330. As shown in FIG. 3C, one slit 336d continuing in the X-axis direction is formed below two second through holes 36c in the first and second metal terminals 330. Any shape and number of the slits 336d are employed as long as they are formed between a part of the first and second metal terminals 330 facing the lower ends of the first end surfaces 20a of the capacitor chips 20 (chip second sides 20h) and the terminal second side 36hb (i.e., terminal connection part 36k).

Fourth Embodiment

Figure 3D:
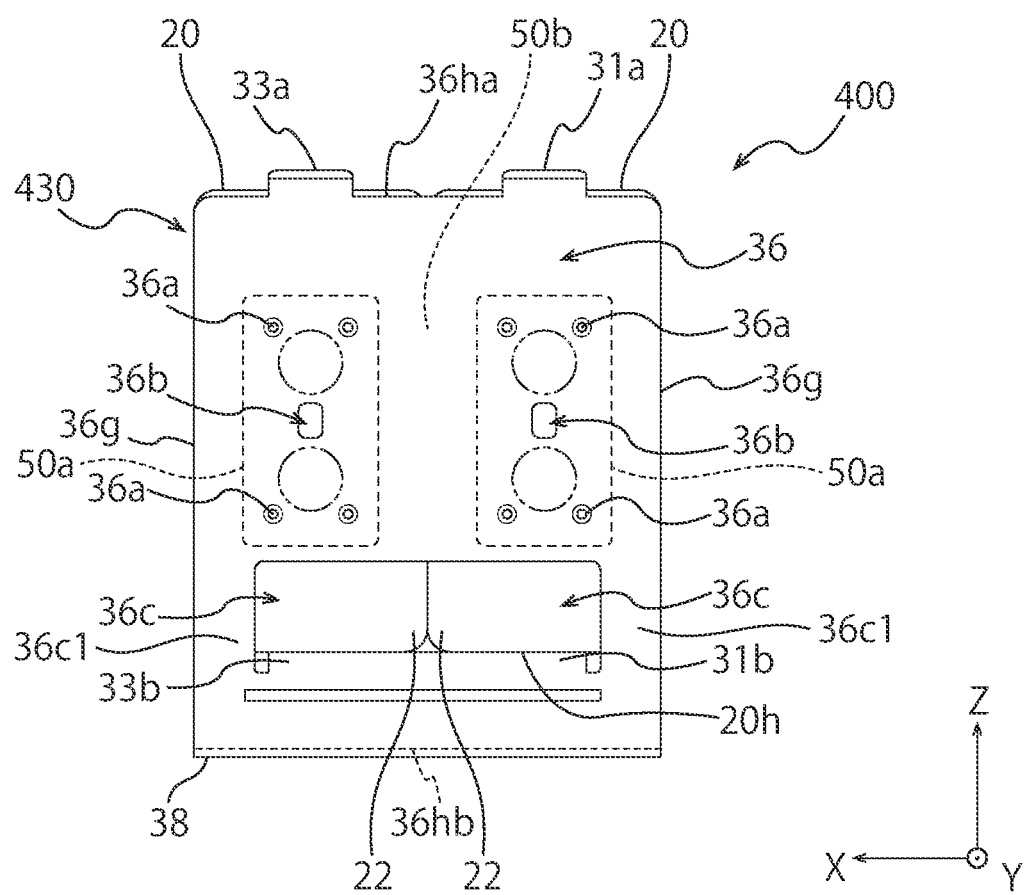
FIG. 3D is a left-side view of a ceramic electronic device according to further another embodiment of the present invention.

FIG. 3D is a left-side view illustrating a capacitor 400 according to Fourth Embodiment of the present invention. The capacitor 400 according to Fourth Embodiment is similar to the capacitor 10 according to First Embodiment except for shapes of second through holes 36c formed on first and second metal terminals 430. As shown in FIG. 3D, one second through hole 36c continuing in the X-axis direction is formed in the first and second metal terminals 430. The second through hole 36c is formed in the electrode facing portion 36 so that a part of the terminal electrode 22 (part of lower portion) corresponding to the inner electrode layers 26 at the lower part (Z-axis direction) of the chips 20 adjacent to each other is exposed outside.

In the present embodiment, a width of the second through hole 36c in the X-axis direction is preferably smaller than a total width of the chips 20 in the X-axis direction, and is preferably ⅙ to ⅚, more preferably ⅓ to ⅔, of a total width of the chips 20 in the X-axis direction.

Fifth Embodiment

Figure 3E:
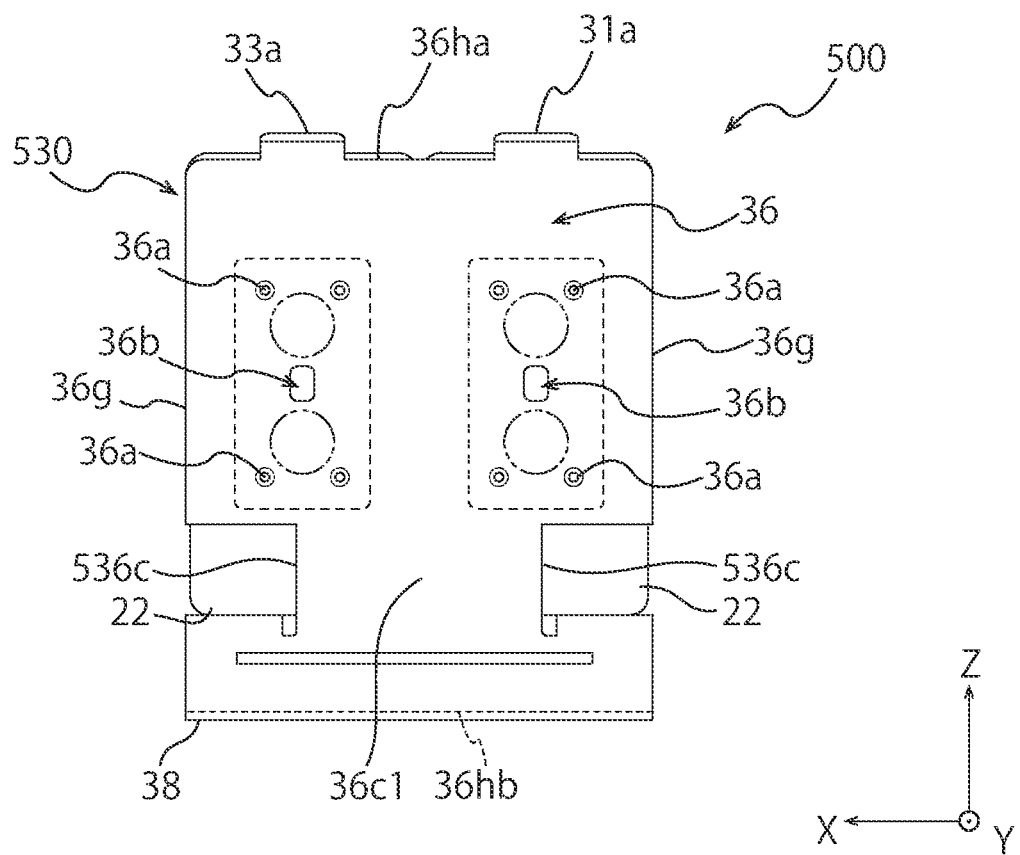
FIG. 3E is a left-side view of a ceramic electronic device according to further another embodiment of the present invention.

FIG. 3E is a left-side view illustrating a capacitor 500 according to Fifth Embodiment of the present invention. The capacitor 500 according to Fifth Embodiment is similar to the capacitor 10 according to First Embodiment except that notches (openings) 536c are formed in first and second metal terminals 530 instead of the second through holes 36c. As shown in FIG. 3E, the non-opening region 36c1 is formed in the middle of the first and second metal terminals 530 in the X-axis direction, and the notches 536c are formed on both sides of the non-opening region 36c1. The notches 536c are formed so that a part of the terminal electrodes 22 (part of lower portion) corresponding to the internal electrode layers 26 at the lower part in the Z-axis direction is exposed outside.

Sixth Embodiment

Figure 3F:
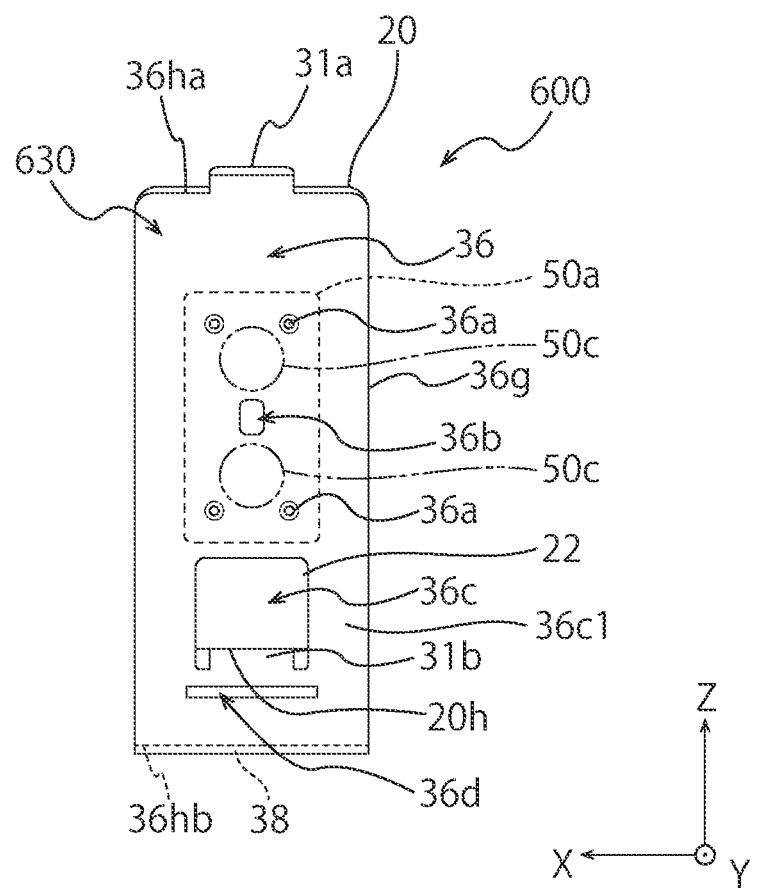
FIG. 3F is a left-side view of a ceramic electronic device according to further another embodiment of the present invention.

FIG. 3F is a left-side view illustrating a capacitor 600 according to Sixth Embodiment of the present invention. The capacitor 600 according to Sixth Embodiment is similar to the capacitor 10 according to First Embodiment except that only one capacitor chip 20 is connected to first and second metal terminals 630. In the present embodiment, similar effects to First Embodiment are demonstrated.

Other Embodiments

Incidentally, the present invention is not limited to the above-mentioned embodiments, and may variously be changed within the scope of the present invention.

For example, the metal terminals 30, 130, 40, 140, 330, 430, 530, and 630 are provided with the protrusions 36a, the first through hole 36b, and the slit 36d as necessary (or 336d), but the metal terminal of the present invention is not limited to these metal terminals, and the electronic device of the present invention includes a variation where one or more of these components are not formed. In the above-mentioned embodiments, a pair of arm portions (e.g., 31a and 31b) is provided in the Z-axis direction, but one arm portion (e.g., 31a, 33a, 35a, 41a, 43a, and 45a) located at the upper part in the Z-axis direction may be omitted, and only the other arm portion (e.g., 31b, 33b, 35b, 41b, and 43b) may be employed. Instead, both arm portions (e.g., 31a and 31b) in the Z-axis direction may be omitted, and the metal terminals 30, 130, 40, 140, 330, 430, 530, and 630 having the opening 36c may be connected to the terminal electrode 22 (24) of the chip 20 only by the joint region 50a.

Figure 12:
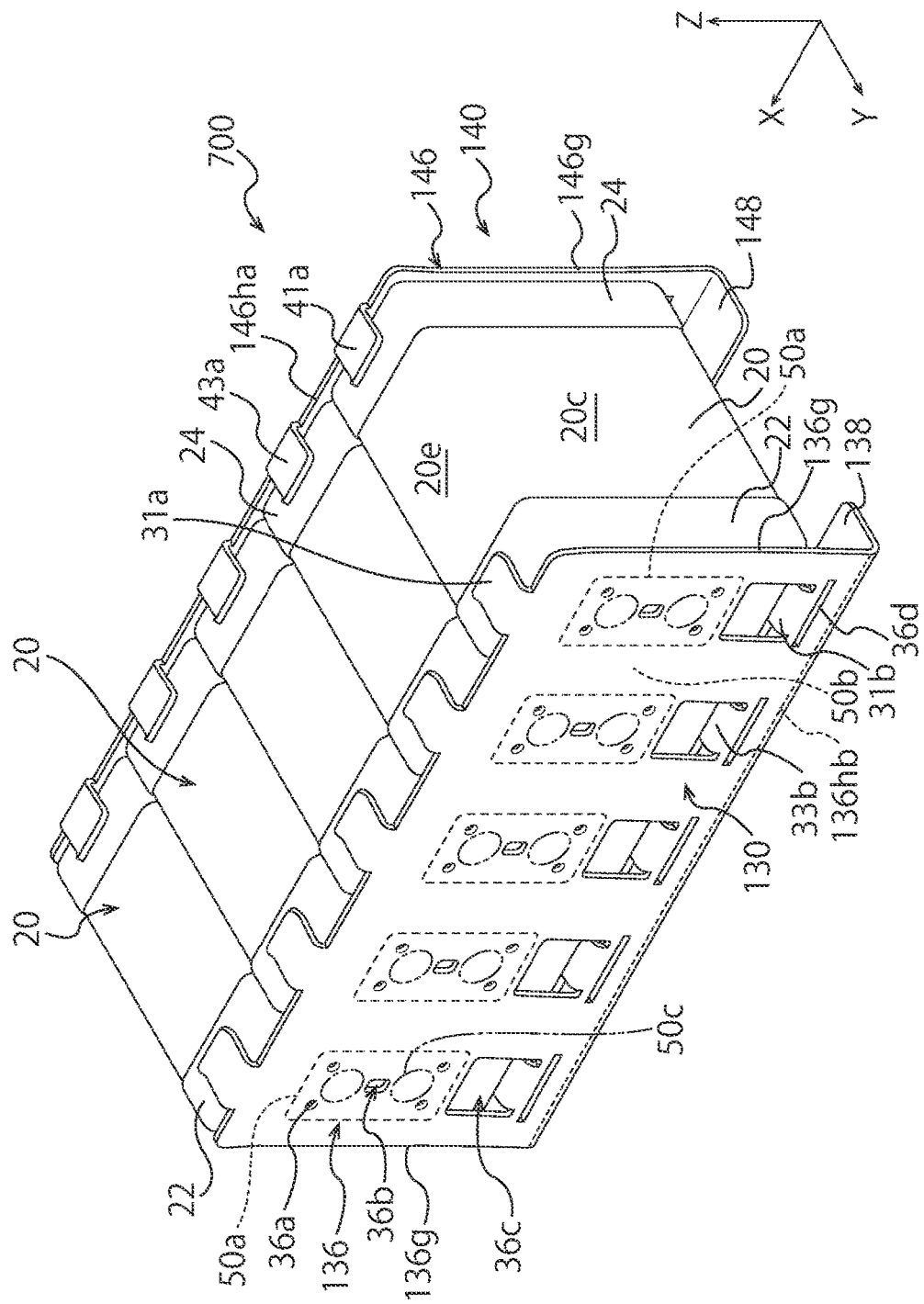
FIG. 12 is a schematic perspective view illustrating a ceramic electronic device according to a variation of the embodiment shown in FIG. 7.
Figure 13:
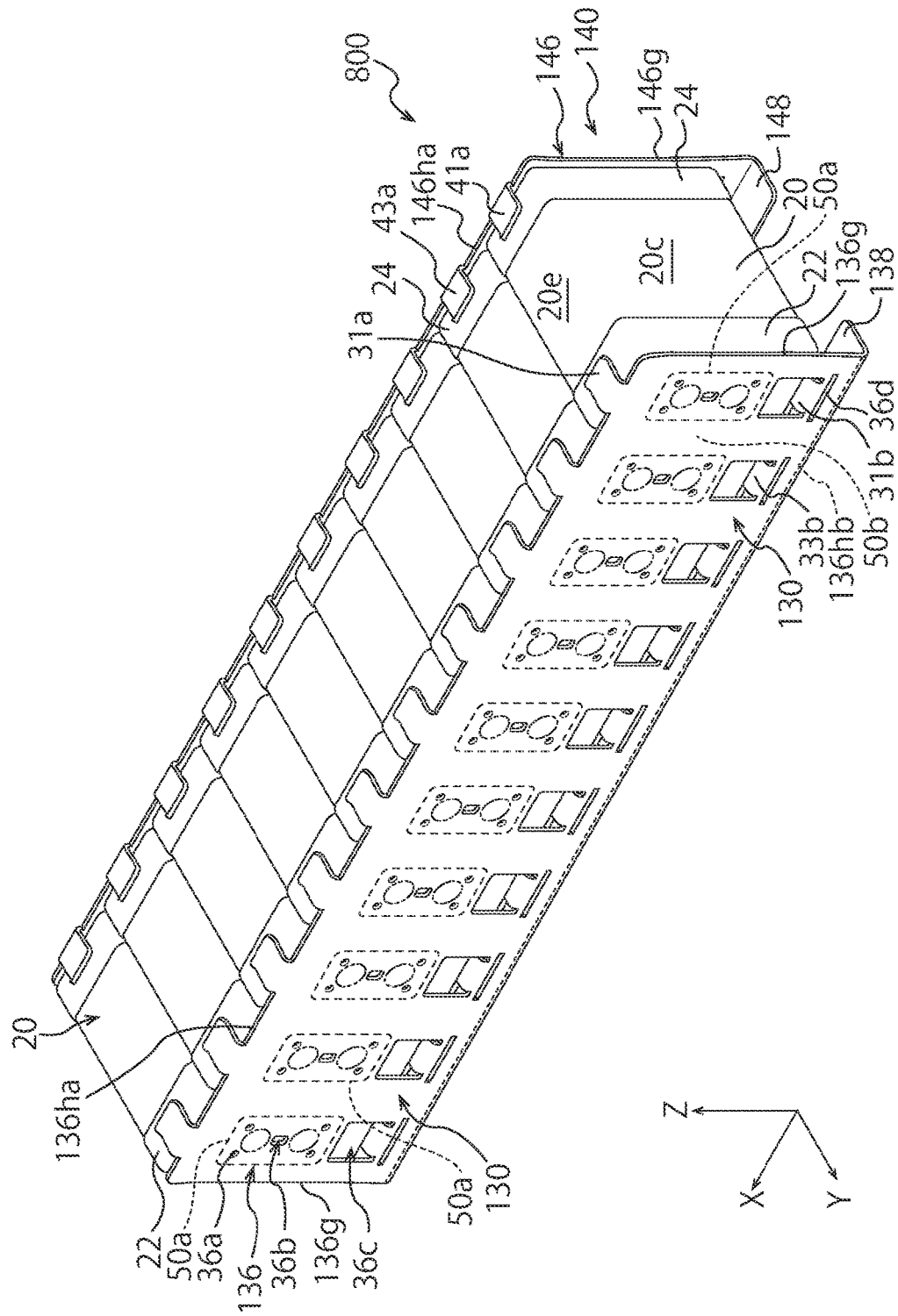
FIG. 13 is a schematic perspective view illustrating a ceramic electronic device according to a variation of the embodiment shown in FIG. 12.

In the present invention, the number of chips owned by the electronic device may be singular or any plural. For example, the metal terminals 130 and 140 of the capacitor 700 shown in FIG. 12 respectively have five capacitor chips 20 in the X-axis direction. Moreover, the metal terminals 130 and 140 of the capacitor 800 shown in FIG. 13 hold 10 capacitor chips 20 in the X-axis direction.

NUMERICAL REFERENCES 10, 100, 200, 300, 400, 500, 600, 700, 800 . . . capacitor
20 . . . capacitor chip
20a . . . first end surface
20b . . . second end surface
20c . . . first side surface
20d . . . second side surface
20e . . . third side surface
20f . . . fourth side surface
20g . . . chip first side
20h . . . chip second side
20j . . . chip third side
22 . . . first terminal electrode
24 . . . second terminal electrode
26 . . . internal electrode layer
28 . . . dielectric layer
30, 130, 40, 140, 330, 430, 530 . . . metal terminal
31a, 33a, 35a, 41a, 43a, 45a . . . upper arm portion (holding portion)
31b, 33b, 35b, 41b, 43b . . . lower arm portion (holding portion)
36, 136, 46, 146 . . . electrode facing portion
36a, 46a . . . protrusion
36b . . . first through hole
36c . . . second through hole
36c1 . . . non-opening region
36d, 46d . . . slit
36g . . . terminal first side
36ha, 36hb . . . terminal second side
38, 138, 48, 148 . . . mount portion 50 . . . connection member
50a . . . joint region
50b . . . non-joint region
50c . . . initial application region
50d . . . non-joint gap

What is claimed is:

1. An electronic device comprising:
a chip component including an element body containing laminated internal electrodes and a terminal electrode formed outside the element body so as to connect with ends of the internal electrodes; and
a metal terminal connectable with the terminal electrode of the chip component,
wherein the metal terminal comprises:
an electrode facing portion disposed correspondingly to an end surface of the terminal electrode;
a holding portion configured to hold the chip component; and
a mount portion configured to be placed on a mount surface,
wherein a connection member connecting between the electrode facing portion and the end surface of the terminal electrode exists in a joint region in a predetermined range,
wherein a non-joint region is formed between an edge of the joint region and the holding portion,
wherein a non-joint gap between the electrode facing portion and the end surface of the terminal electrode becomes larger toward the holding portion in the non-joint region, and
wherein a maximum width of the non-joint gap is 1.2 to 7 times larger than a minimum width of the non-joint gap.

2. The electronic device according to claim 1, wherein a minimum width of the non-joint gap is as large as a thickness of the connection member.

3. The electronic device according to claim 1, wherein end surfaces of terminal electrodes of a plurality of chip components are joined with the electrode facing portion while being arranged adjacent to each other in a plurality of joint regions, and
the non-joint region is also formed between the adjacent joint regions.

4. The electronic device according to claim 1, wherein a first through hole going through front and back surfaces of the electrode facing portion is formed in the joint region.

5. The electronic device according to claim 1, wherein the connection member is solder.

6. The electronic device according to claim 1, wherein
a second through hole going through front and back surfaces of the electrode facing portion is formed in the non-joint region, and
the holding portion extends from an opening edge of the second through hole.

7. The electronic device according to claim 1, wherein protrusions protruding toward the end surface of the terminal electrode are formed on an inner surface of the electrode facing portion in the joint region.

8. An electronic device comprising:
a chip component including an element body containing laminated internal electrodes and a terminal electrode formed outside the element body so as to connect with ends of the internal electrodes; and
a metal terminal connectable with the terminal electrode of the chip component,
wherein the metal terminal comprises:
an electrode facing portion disposed correspondingly to an end surface of the terminal electrode;
a holding portion configured to hold the chip component; and
a mount portion configured to be placed on a mount surface,
wherein a connection member connecting between the electrode facing portion and the end surface of the terminal electrode exists in a joint region in a predetermined range,
wherein a non-joint region is formed between an edge of the joint region and the holding portion,
wherein a non-joint gap between the electrode facing portion and the end surface of the terminal electrode becomes larger toward the holding portion in the non-joint region, and
wherein an area of the non-joint region is larger than $3/10$ of an area of the joint region between the electrode facing portion and the end surface of the terminal electrode.

9. The electronic device according to claim 8, wherein end surfaces of terminal electrodes of a plurality of chip components are joined with the electrode facing portion while being arranged adjacent to each other in a plurality of joint regions, and
the non-joint region is also formed between the adjacent joint regions.

10. The electronic device according to claim 8, wherein a first through hole going through front and back surfaces of the electrode facing portion is formed in the joint region.

11. The electronic device according to claim 8, wherein the connection member is solder.

12. The electronic device according to claim 8, wherein
a second through hole going through front and back surfaces of the electrode facing portion is formed in the non-joint region, and
the holding portion extends from an opening edge of the second through hole.

13. The electronic device according to claim 8, wherein protrusions protruding toward the end surface of the terminal electrode are formed on an inner surface of the electrode facing portion in the joint region.

14. An electronic device comprising:
a chip component including an element body containing laminated internal electrodes and a terminal electrode formed outside the element body so as to connect with ends of the internal electrodes; and
a metal terminal connectable with the terminal electrode of the chip component,
wherein the metal terminal comprises:
an electrode facing portion disposed correspondingly to the end surface of the terminal electrode;
a holding portion configured to hold the chip component; and
a mount portion configured to be placed on a mount surface,
wherein a connection member connecting between the electrode facing portion and the end surface of the terminal electrode exists in a joint region in a predetermined range,
wherein a non-joint region is formed between an edge of the joint region and the holding portion, and
wherein the electrode facing portion is warped from the end surface of the terminal electrode toward the holding portion in the non joint region, and wherein an area of the non-joint region is larger than 3/10 of an area of the joint region between the electrode facing portion and the end surface of the terminal electrode.

15. The electronic device according to claim 14, wherein end surfaces of terminal electrodes of a plurality of chip components are joined with the electrode facing portion while being arranged adjacent to each other in a plurality of joint regions, and
the non-joint region is also formed between the adjacent joint regions.

16. The electronic device according to claim 14, wherein a first through hole going through front and back surfaces of the electrode facing portion is formed in the joint region.

17. The electronic device according to claim 14, wherein the connection member is solder.

18. The electronic device according to claim 14, wherein
a second through hole going through front and back surfaces of the electrode facing portion is formed in the non-joint region, and
the holding portion extends from an opening edge of the second through hole.

19. The electronic device according to claim 14, wherein protrusions protruding toward the end surface of the terminal electrode are formed on an inner surface of the electrode facing portion in the joint region.

* * * * *